United States Patent
Nakagawa

(10) Patent No.: US 10,263,554 B2
(45) Date of Patent: Apr. 16, 2019

(54) POWER SUPPLY DEVICE FOR INTERNAL COMBUSTION ENGINE

(71) Applicant: MAHLE ELECTRIC DRIVES JAPAN CORPORATION, Numazu-Shi, Shizuoka-Ken (JP)

(72) Inventor: Masanori Nakagawa, Numazu (JP)

(73) Assignee: MAHLE ELECTRIC DRIVES JAPAN CORPORATION, Numazu (JP)

( * ) Notice: Subject to any disclaimer, the term of this patent is extended or adjusted under 35 U.S.C. 154(b) by 0 days.

(21) Appl. No.: 15/744,200

(22) PCT Filed: Jul. 17, 2015

(86) PCT No.: PCT/JP2015/070494
§ 371 (c)(1),
(2) Date: Jan. 12, 2018

(87) PCT Pub. No.: WO2017/013699
PCT Pub. Date: Jan. 26, 2017

(65) Prior Publication Data
US 2018/0205336 A1 Jul. 19, 2018

(51) Int. Cl.
*H02P 9/00* (2006.01)
*H02P 9/30* (2006.01)
(Continued)

(52) U.S. Cl.
CPC ........... *H02P 9/305* (2013.01); *H02K 21/046* (2013.01); *H02M 7/1557* (2013.01); *H02P 9/04* (2013.01);
(Continued)

(58) Field of Classification Search
CPC .... H02P 9/40; H02P 9/48; H02P 9/305; H02P 9/04; H02M 7/1557; H02K 21/046
(Continued)

(56) References Cited

U.S. PATENT DOCUMENTS 4,328,427 A * 5/1982 Bond ............. B60L 11/06
290/3
4,539,515 A * 9/1985 Morishita ......... H02J 7/1423
307/16
(Continued)

FOREIGN PATENT DOCUMENTS

CN 1660621 A 8/2005
EP 1568533 A1 8/2005
(Continued)

OTHER PUBLICATIONS

International Search Report from PCT/JP2015/070494, dated Oct. 6, 2015.

*Primary Examiner* — Julio C. Gonzalez
(74) *Attorney, Agent, or Firm* — Pearne & Gordon LLP

(57) ABSTRACT

A power supply device for an internal combustion engine, using a generator driven by an internal combustion engine as a power source and supplying power to a first load that needs to be constantly driven to cause the internal combustion engine to operate and a second load that is permitted not to drive during startup of the engine, wherein a first generation coil for driving the first load and a second generation coil for driving the second load are provided to be magnetically-coupled tightly in the generator, and voltage supplied to a load is boosted to a higher voltage value than conventionally achieved by performing chopper control of an energizing current of the first generation coil and an energizing current of the second generation coil while preventing energization from the second generation coil to a load.

12 Claims, 12 Drawing Sheets

(51) Int. Cl.
*H02K 21/04* (2006.01)
*H02M 7/155* (2006.01)
*H02P 9/04* (2006.01)
*H02P 9/10* (2006.01)
*H02P 9/48* (2006.01)

(52) U.S. Cl.
CPC ............... *H02P 9/107* (2013.01); *H02P 9/30* (2013.01); *H02P 9/48* (2013.01)

(58) Field of Classification Search
USPC .............. 322/20, 44, 59, 89; 290/40 R, 40 A
See application file for complete search history.

(56) References Cited

U.S. PATENT DOCUMENTS

| | | | |
|---|---|---|---|
| 5,057,763 A * | 10/1991 | Torii | H02J 7/1438 219/203 |
| 6,111,390 A | 8/2000 | Inaba et al. | |
| 6,414,400 B1 | 7/2002 | Scott et al. | |
| 6,737,756 B1 * | 5/2004 | Gale | B60L 11/1803 290/7 |
| 7,395,888 B2 | 7/2008 | Yamamoto et al. | |
| 8,487,559 B2 * | 7/2013 | Holweck | B60L 7/003 318/362 |
| 2005/0190524 A1 | 9/2005 | Yamamoto et al. | |
| 2009/0160247 A1 * | 6/2009 | Nakamura | B60K 6/365 307/9.1 |
| 2014/0350761 A1 * | 11/2014 | Endo | B60W 20/00 701/22 |
| 2017/0257052 A1 * | 9/2017 | Yamamoto | B60K 6/445 |
| 2018/0254724 A1 * | 9/2018 | Arai | F02N 11/04 |

FOREIGN PATENT DOCUMENTS

| | | |
|---|---|---|
| JP | H08-33228 A | 2/1996 |
| JP | H11234992 A | 8/1999 |
| JP | 2003-79004 A | 3/2003 |
| JP | 2005245144 A | 9/2005 |
| JP | 2013146131 A | 7/2013 |
| WO | 2001058002 A2 | 8/2001 |

* cited by examiner

POWER SUPPLY DEVICE FOR INTERNAL COMBUSTION ENGINE

TECHNICAL FIELD

The present invention relates to a power supply device for supplying power to various electrical components by using a generator driven by an internal combustion engine as a power source.

BACKGROUND ART

Magnet generators including a magnet rotor whose field system is configured by using a permanent magnet, and a stator made by winding a generation coil around an armature core having magnetic pole parts facing magnetic poles of the magnet rotor are widely used as generators attached to internal combustion engines. While magnet generators are AC generators, most electric components provided to machines having internal combustion engines mounted thereon are DC loads. Accordingly, when configuring a power supply device for supplying power to various electric components by using such a generator as a power source, a circuit for converting the output voltage of the generator into DC voltage is necessary.

When a device having an internal combustion engine mounted thereon is not provided with a battery, it is necessary to drive electric component loads that need to be constantly driven to cause the engine to operate, such as a fuel pump of a fuel injection device for supplying the internal combustion engine with fuel and an ignition device for igniting the engine, by using a power supply device using a generator driven by the internal combustion engine as a power source. In order to improve startability of the internal combustion engine in such a case, not only it is necessary to increase the voltage generated by the generator while the engine is rotating at extremely low speed and thereby make the rotation speed at which the supply of power from the power source to the loads is started as low as possible, it is also necessary to cause a necessary and sufficient level of voltage for driving the loads to be generated also while the engine is rotating at high speed.

Meanwhile, when a device having an internal combustion engine mounted thereon is provided with a battery, a power supply device using a generator driven by the engine as a power source is used to charge the battery. Also in such a power supply device for an internal combustion engine, it is necessary to cause a large output voltage to be generated while the engine is rotating at low speed, without sacrificing the output voltage while the engine is rotating at high speed.

In order to increase generator output voltage while an engine is rotating at extremely low speed, it is necessary to increase the number of turns of the generation coil. However, when increasing the number of turns of the generation coil, the inductance of the generation coil increases, and in addition, the resistance of the coil increases. Due to this, a decrease in the voltage generated while the engine is rotating at high speed cannot be avoided. Thus, the demand for an increase in voltage generated while the engine is rotating at low speed and the demand for an increase in voltage generated while the engine is rotating at high speed are mutually conflicting. It is therefore difficult to configure a power supply device satisfying both these demands merely by providing a generator driven by an engine and a circuit for rectifying output from the generator.

In view of this, as disclosed in Patent Document 1, there has been proposed a power supply device configured to perform chopper control for periodically interrupting a current flowing through a specific generation coil provided in a generator (a control of repeating an operation of causing a short-circuit current or a current similar thereto to flow through the generation coil and an operation of interrupting the current) while the engine is rotating at low speed, whereby boosted voltage is induced in the generation coil.

In the power supply device disclosed in Patent Document 1, a hybrid bridge circuit in which the upper sides of the bridge are configured by using diodes and the lower sides of the bridge are configured by using MOSFETs is used as a circuit converting an AC output voltage from the generation coil into a DC voltage. While the engine is rotating at low speed, chopper control for periodically interrupting the current flowing through the generation coil is performed by concurrently switching on and off the MOSFETs of both lower sides of the bridge, whereby a boosted voltage is induced in the generation coil. This boosted voltage is converted into DC voltage through rectification at a rectification circuit formed by parasitic diodes of the MOSFETs and the diodes of the upper sides of the bridge. By adopting this configuration, it is possible to increase the voltage induced in the generation coil while the engine is rotating at low speed and lower the rotation speed at which driving of loads is started. In addition, output from the generation coil while rotation speed is low can be increased without increasing the number of turns of the generation coil, whereby the voltage generated by the generation coil while the engine is rotating at high speed is prevented from decreasing.

PRIOR ART DOCUMENTS

Patent Documents

[Patent Document 1] Japanese Laid-open Patent Application No. 1108-33228

DISCLOSURE OF THE INVENTION

Problems the Invention is Intended to Solve

When using the power supply device disclosed in Patent Document 1, it is possible to lower the rotation speed at which the driving of loads is started by increasing the voltage supplied to the loads when the engine is rotating at low speed while preventing a decrease in voltage supplied to the loads while the engine is rotating at high speed. However, even if the current flowing through the generation coil which generates power supplied to the loads is periodically interrupted, there is a limit to increase in output voltage when the engine is rotating at low speed, and when it is necessary to further increase output voltage while the engine is rotating at low speed, there have been cases where the demand cannot be satisfied.

The present invention aims to cause DC voltage yielded during low speed rotation to be higher than conventionally achieved, in a power supply device for an internal combustion engine yielding boosted DC voltage by rectifying a voltage induced in a generation coil provided inside a generator driven by the engine by periodically interrupting current flowing through a generation coil.

Means for Solving the Problems

In order to solve the problem described above, the present description discloses at least the first through twelfth aspects of the present invention described in the following.

<First Aspect>

The first aspect is directed to a power supply device for an internal combustion engine, comprising: an AC generator and an AC/DC conversion circuit for converting an output voltage of the AC generator into a DC voltage, the AC generator including a stator having an armature core that has n (n being an integer no smaller than two) radially-arranged tooth portions, and m (m being an integer no smaller than two and no greater than n) unit coils respectively wound around m tooth portions provided to the armature core, and a rotor driven to rotate by an internal combustion engine and including a field system having a plurality of magnetic poles opposing magnetic pole portions formed on tips of the respective tooth portions of the armature core. Here, the recitation "m (m being an integer no smaller than two and no greater than n) unit coils respectively wound around m tooth portions" is used for the purpose of encompassing both a case in which unit coils are would around all n tooth portions, and a case in which a part of the n tooth portions do not have unit coils wound therearound and are left idle.

In the first aspect, the m unit coils are wired to form at least a first generation coil and a second generation coil. Here, the first generation coil is formed by wiring a plurality of unit coils wound around alternately-arranged tooth portions among the m tooth portions provided to the armature core, and the second generation coil is formed by wiring a plurality of unit coils wound around alternately-arranged tooth portions that have a positional relationship of each being adjacent to one of the tooth portions around which the plurality of unit coils forming the first generation coil are wound.

Further, the AC/DC conversion circuit in this aspect includes: a first voltage conversion circuit having first switch means for periodically interrupting a current flowing through the first generation coil when on-off control has been performed and a first rectification circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load.

Further, in this aspect, a switch control unit is provided for performing on-off control of both the first switch means and the second switch means in order to boost the voltage supplied to the first load, while putting the energization-controlling switch in an off state to maintain a state where the energization from the second voltage conversion circuit to the second load is prevented, or while switching the energization-controlling switch on and off to limit a current flowing from the second generation coil to the second load.

As known conventionally, when a current i flowing through a coil with an inductance L is interrupted, a high voltage is induced in the coil by releasing energy $(L \cdot i^2)/2$ having accumulated in the coil while the current i was flowing. As described above, tooth portions around which unit coils forming the first generation coil are wound and tooth portions around which unit coils forming the second generation coil are arranged to be adjacent to one another, whereby the first generation coil and the second generation coil are magnetically-coupled tightly; and when both the current flowing through the first generation coil and the current flowing through the second generation coil are periodically interrupted while preventing the current flowing from the second voltage conversion circuit to the second load by putting the energization-controlling switch in an off state, or limiting the current flowing from the second voltage conversion circuit to the second load by causing the energization-controlling switch to switch on and off at a duty ratio lower than one, it is possible for the energy released from the second generation coil when the current having been flowing through the second generation coil is interrupted to be transferred to the first generation coil, which is magnetically-coupled tightly with the second generation coil, and superimposed on the energy released from the first generation coil when the current having been flowing through the first generation coil is interrupted. Accordingly, the voltage induced in the first generation coil can be further raised above the voltage induced when only the current flowing through the first generation coil has been interrupted.

Accordingly, by adopting the above-described configuration, it is possible to cause the first generation coil to output a voltage higher than the output voltage when applying the conventional technique of boosting the output voltage by periodically interrupting only the current flowing through the first generation coil, and the voltage outputted from the first generation coil at a low engine rotation speed range can be increased above the conventionally achievable level.

<Second Aspect>

The second aspect is also directed to a power supply device for an internal combustion engine, similar to that of the first aspect. In this aspect, each unit coil constituting a part of the first generation coil is provided to form a pair with one unit coil constituting the second generation coil, and each pair of the unit coil of the first generation coil and unit coil of the second generation coil are wound around a same tooth portion of the armature core. Other configurations of the second aspect are similar to those of the first aspect.

The first generation coil and the second generation coil can be magnetically-coupled tightly also when making this configuration. Accordingly, the energy released from the second generation coil when the current having been flowing through the second generation coil is interrupted is superimposed on the energy released from the first generation coil when the current having been flowing through the first generation coil is interrupted. Accordingly, the voltage induced in the first generation coil can be raised above the voltage induced when interrupting only the current having been flowing through the first generation coil.

<Third Aspect>

The third aspect is applicable to the first aspect and the second aspect. In this aspect, the first load is an electric component required to be driven for operation of the internal combustion engine, and the second load is a load permitted to stop driving during a process of starting up the internal combustion engine, such as a lamp load. In this aspect, a number of turns of the first generation coil and a number of turns of the second generation coil are set so that output of a load current from the first voltage conversion circuit starts when a rotation speed of the rotor increases to reach a first preset speed set to be lower than an idling rotation speed of the internal combustion engine, and output of a load current from the second voltage conversion circuit starts when the rotation speed of the rotor increases to reach a second preset speed higher than the first preset speed.

According to the above configuration, when providing a system to be driven by the internal combustion engine with a battery-less configuration by causing an electric component required to be driven for operation of the engine to be energized by the engine driven generator, the rotation speed at which the electrical component starts driving can be lowered, whereby startability of the engine can be improved.

<Fourth Aspect>

The fourth aspect is applicable to the third aspect. In this aspect, the switch control unit is configured to perform the on-off control of the first switch means and the on-off control of the second switch means concurrently until the startup of the internal combustion engine is completed.

<Fifth Aspect>

The fifth aspect is applicable to the fourth aspect. In this aspect, the switch control unit is configured to perform the on-off control of the first switch means and the on-off control of the second switch means synchronously.

<Sixth Aspect>

The sixth aspect is applicable to the third, fourth, or fifth aspect. In this aspect, the first voltage conversion circuit comprises a first bridge circuit in which one of an upper arm and a lower arm of each leg is configured from a diode and the other one of the upper arm and the lower arm of each leg is configured from a MOSFET, the first switch means is configured from the MOSFET that constitutes part of the other one of the upper arm and the lower arm of the first bridge circuit, and the first rectification circuit is configured from the diode constituting part of the one of the upper and the lower arm of the first bridge circuit and a parasitic diode formed between a drain and a source of the MOSFET constituting part of the other one of the upper arm and the lower arm of the first bridge circuit. Further, the second voltage conversion circuit comprises a second bridge circuit in which one of an upper arm and a lower arm of each leg is configured from a diode and the other one of the upper arm and the lower arm of each leg is configured from a MOSFET, the second switch means is configured from the MOSFET constituting part of the other one of the upper arm and the lower arm of the second bridge circuit, and the second rectification circuit is configured from the diode constituting part of the one of the upper and the lower arm of the second bridge circuit and a parasitic diode formed between a drain and a source of the MOSFET constituting part of the other one of the upper arm and the lower arm of the second bridge circuit.

<Seventh Aspect>

The seventh aspect is applicable to any one of the third through sixth aspects. In this aspect, the energization-controlling switch is inserted between the second rectification circuit and a load of the second rectification circuit. In this case, the switch control unit controls the energization-controlling switch so as to maintain the energization-controlling switch in an off state until the startup of the internal combustion engine is completed, and to permit the energization-controlling switch to switch to the on state after the startup of the internal combustion engine is completed.

<Eighth Aspect>

The eighth aspect is applicable to any one of the third through fifth aspects. In this aspect, the first voltage conversion circuit, the second voltage conversion circuit, and the switch control unit are configured as follows.

The first voltage conversion circuit comprises a first bridge circuit in which one of an upper arm and a lower arm of each leg is configured from a diode and the other one of the upper arm and the lower arm of each leg is configured from a MOSFET, and the first switch means is configured from the MOSFET constituting part of the other one of the upper arm and the lower arm of the first bridge circuit, and the first rectification circuit is configured from the diode constituting part of the one of the upper and the lower arm of the first bridge circuit and a parasitic diode formed between a drain and a source of the MOSFET constituting part of the other one of the upper arm and the lower arm of the first bridge circuit.

The second voltage conversion circuit comprises a second bridge circuit in which one of an upper arm and a lower arm of each leg is configured from a thyristor and the other one of the upper arm and the lower arm of each leg is configured from a MOSFET, the second switch means is configured from the MOSFET constituting part of the other one of the upper arm and the lower arm of the second bridge circuit, and the second rectification circuit is configured from the thyristor constituting part of the one of the upper and the lower arm of the second bridge circuit and a parasitic diode formed between a drain and a source of the MOSFET constituting part of the other one of the upper arm and the lower arm of the bridge circuit.

In this case, the switch control unit is configured to stop supply of trigger signals to the thyristors of the second voltage conversion circuit until the startup of the internal combustion engine is completed, and supply trigger signals to the thyristors of the second voltage conversion circuit after the startup of the internal combustion engine is completed.

<Ninth Aspect>

The ninth aspect is directed to a power supply device similar to the power supply device for an internal combustion engine to which the first aspect is directed. In this aspect, the voltage induced in the first generation coil is boosted by solely performing control of periodically interrupting the current flowing through the second generation coil.

In this aspect, the second generation coil has a greater number of turns than the first generation coil. Further, similar to the first aspect, each of the unit coils forming the first generation coil is wound around a tooth portion adjacent to one of the tooth portions around which the unit coils forming the second generator are wound.

In this aspect, because the voltage induced in the first generation coil is boosted by solely performing control of periodically interrupting the current flowing through the second generation coil, the AC/DC conversion circuit includes: a first voltage conversion circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load. In this case, the switch control unit is configured to perform on-off control of the second switch means in order to boost the voltage supplied to the first load, while maintaining the energization-controlling switch in an off state, or while switching the energization-controlling switch on and off to limit a current flowing from the second generation coil to the second load.

As described above, when providing the second generation coil with a greater number of turns than the first generation coil, the second generation coil will have greater inductance than the first generation coil. When periodically interrupting the current flowing through the second generation coil with greater inductance while magnetically-coupling tightly the first generation coil with smaller inductance and the second generation coil with greater inductance, the great energy released when the current flowing through the second generation coil is interrupted can be transferred to the first generation coil. Accordingly, without periodically interrupting the current flowing through the first generation coil with smaller inductance, the voltage induced in the first generation coil can be increased to be higher compared to when the current flowing through the first generation coil is periodically interrupted.

By adopting a configuration as described in the ninth aspect, the induction voltage of the first generation coil can be boosted without performing control of periodically interrupting the energizing current of the first generation coil. Accordingly, the voltage supplied to a load driving on output from the first generation coil can be increased without making circuit configuration of the power supply device complex.

<Tenth Aspect>

The tenth aspect has a configuration similar to the configuration of the ninth aspect, except for each unit coil constituting a part of the first generation coil being provided to form a pair with any one of unit coils constituting a part of the second generation coil, and unit coils of the first generation coil and the second generation coil that form a pair being wound around a same tooth portion of the armature core.

<Eleventh Aspect>

The eleventh aspect is applicable to any one of the first through tenth aspects. In this aspect, the m unit coils wound around the m tooth portions of the armature core of the AC generator further include a unit coil or coils forming another power generation coil. This means that it is permitted in this aspect that the stator of the generator be further provided with another generation coil, in addition to the first generation coil and the second generation coil.

<Twelfth Aspect>

The twelfth aspect is applicable to any one of the first through tenth aspects. In this aspect, the m unit coils wound around the m tooth portions of the armature core of the AC generator further include one or more unit coils forming a third generation coil having a greater number of turns than the first generation coil, and a power supply circuit for control converting an output of the third generation coil into a constant DC voltage is provided. In this case, the switch control unit is configured to operate by receiving power source voltage from the power supply circuit for control.

By adopting the above configuration, an output voltage of the power supply circuit for control is established and the switch control unit is put in operable state at a rotation speed lower than the rotation speed at which the first generation coil starts driving a load. Accordingly, a voltage for causing the switch control unit to function and drive a load can be generated without using a battery. Hence, the power supply device of this aspect is applicable to a battery-less system.

Effect of the Invention

According to the first through eighth aspects, the first generation coil and the second generation coil provided to the stator are magnetically-coupled tightly, and both the current flowing through the first power generation coil and the current flowing through the second power generation coil are periodically interrupted concurrently while energization from the second generation coil to the load is in a state of being interrupted or limited. Due to this, the energy released from the second generation coil when interrupting the current flowing through the second generation coil is transferred to the first generation coil, and the voltage induced in the first generation coil can be boosted to a voltage higher than when performing a control of periodically interrupting only the current flowing through the first generation coil. Hence, according to the first through eighth aspects, the voltage induced in the first generation coil at a low rotation speed range of an engine can be raised above that achieved in the conventional technology, and a load driving on output from the first generation coil can be activated at a rotation speed lower than conventionally achieved.

In addition, according to the ninth and tenth aspects of the present disclosure, the second generation coil is provided with a greater number of turns than the first generation coil to provide the second generation coil with higher inductance than the first generation coil. Further, the first generation coil and the second generation coil are magnetically-coupled tightly, and the voltage induced in the first generation coil is boosted by periodically interrupting the current flowing to second generation coil, which is the generation coil having greater inductance. Accordingly, the induced voltage of the first generation coil can be boosted to a voltage higher than conventionally achieved without performing the control of periodically interrupting the energizing current of the first generation coil. Hence, voltage supplied to a load driving on output from the first generation coil can be increased without making the circuit configuration of the power supply device complex.

BEST MODE FOR CARRYING OUT THE INVENTION

With reference to the drawings, the following describes an embodiment of the present invention, taking as an example a case in which the present invention is applied to a power supply device for an internal combustion engine to be used for so-called battery-less machines, being machines that have internal combustion engines mounted thereon that are not provided with batteries.

Loads to which a power supply device attached to an internal combustion engine supplies power in a battery-less device include: loads that need to be (are essential to be) constantly driven for causing the engine to operate, such as an ignition device for igniting the internal combustion engine and a fuel pump for supplying fuel to the engine; loads including control devices such as electronic control units (ECUs) for controlling devices such as the ignition device and the fuel pump that need to be constantly driven; and loads such as lamps that are driven by a driver when necessary. In the present description, a load that needs to be constantly driven in order for an engine to operate, such as an ignition device or a fuel pump, is referred to as a "constantly driven load" or a "first load", and a load that is driven when necessary after the driver has started up an engine, such as a headlight, is referred to as a "occasionally driven load" or a "second load". Further, a load such as a control device for controlling a constantly driven load is referred to as a "control system load" or a "third load."

Among loads to be driven by an AC generator mounted on an internal combustion engine, constantly driven loads (first loads) need to start operating immediately following an operation for starting up the engine, and thus, need to start operating at a rotation speed immediately after the startup operation is commenced (a rotation speed sufficiently lower than a rotation speed when the startup is completed). Further, control system loads (third loads) already need to be in a state of being capable of controlling the constantly driven loads at the point when the constantly driven loads start operating upon startup of the engine, and thus, need to start operating at a rotation speed even lower than the rotation speed at which constantly driven loads start operating. Meanwhile, occasionally driven loads (second loads) do not necessarily have to be caused to operate upon startup of the engine, and it is permissible that occasionally driven loads start operating after the startup of the internal combustion engine is completed. As can be seen from this, a power supply device for an internal combustion engine to be applied to a battery-less machine needs to supply power to loads having different required drive characteristics, and cannot supply power to all loads with a single generation coil having a certain number of turns. Due to this, multiple generation coils having output characteristics suitable for different loads are provided to such a power supply device.

Figure 12:
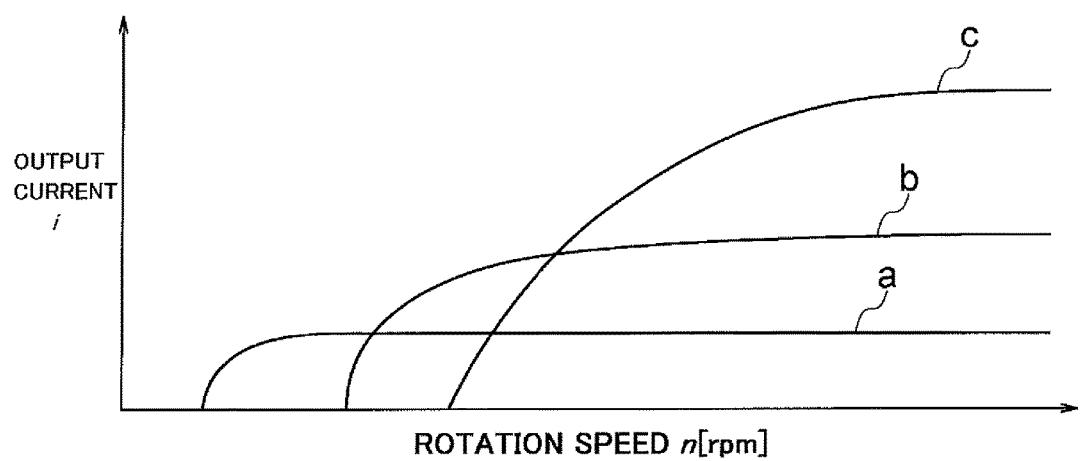
FIG. 12 is a graph showing one example of power supply characteristics required when a machine having an internal combustion engine mounted thereon is battery-less.

FIG. 12 schematically shows output characteristics (output current vs. rotation speed characteristics) of generation coils required in a power supply device to be applied to a battery-less machine. In FIG. 12, the horizontal axis indicates rotation speed N of a generator rotor, and the vertical axis indicates output current i of generation coils. In FIG. 12, curve a and curve b respectively indicate an output characteristic of a generation coil for driving control system loads (third loads) and an output characteristic of a generation coil for driving constantly driven loads (first loads). Curve c indicates an output characteristic of a generation coil for driving occasionally driven loads (second loads).

The generation coil for driving control system loads needs to be wound to have a sufficiently great number of turns, in order to drive the loads from when rotation speed is extremely low immediately after the startup operation of the engine is commenced, as shown by curve a in FIG. 12. The provision of a great number of turns to a generation coil leads to saturation or decrease in output while the engine is rotating at high speed, but this is not a problem because the power necessary for driving control system loads is very small.

The generation coil for driving constantly driven loads not only needs to generate output necessary to drive the loads at a rotation speed upon startup of the engine, but also needs to generate considerably large output while the engine is rotating at high speed. Due to this, the generation coil for driving constantly driven loads needs to have a smaller number of turns than the generation coil for driving control system loads. Accordingly, the output characteristic of the generation coil for driving constantly driven loads, as shown by curve b in FIG. 12, is a characteristic such that the output of the generation coil for driving constantly driven loads starts to rise at a rotation speed higher than the rotation speed at which the output of the generation coil for driving control system loads starts to rise and that is lower than an idling rotation speed of the engine, and the generation coil for driving constantly driven loads produces larger output than the generation coil for driving control system loads while the engine is rotating at high speed.

The generation coil for driving occasionally driven loads is provided with the smallest number of turns because while the output of generation coil for driving occasionally driven loads need not be sufficient upon startup of the engine, it is necessary to ensure that the generation coil for driving occasionally driven loads generates a sufficiently large output when the startup of the engine has been completed and the output of the generation coil for driving occasionally driven loads does not decrease while the engine is rotating at high speed. Accordingly, the output characteristic of the generation coil for driving occasionally driven loads, as shown by curve c in FIG. 12, is a characteristic such that the output of the generation coil for driving occasionally driven loads starts to rise at a rotation speed higher than the rotation speed at which the output of the generation coil for driving constantly driven loads starts to rise, and the generation coil for driving occasionally driven loads produces larger output than the generation coil for driving constantly driven loads while the engine is rotating at high speed.

In order to improve the startability of the internal combustion engine when using a battery-less power source, it is necessary to cause the output of the generation coil for driving constantly driven loads to start rising at as low a rotation speed as possible, in addition to causing the output of the generation coil for driving control system loads to start rising at as low a rotation speed as possible. In order to achieve this, it suffices to configure the power supply device to boost the output voltage of the generation coil for driving constantly driven load until the startup of the engine is completed. In view of this, a conventional technique is used of boosting the output voltage of the generation coil for driving constantly driven loads by performing chopper control of periodically interrupting energizing current of the generation coil for driving constantly driven load until the startup of the engine is completed. As already described above, however, the increase in output voltage while the engine is rotating at low speed achieved by merely performing chopper control of a current flowing through the generation coil whose output voltage is to be boosted is limited.

In view of this, in the present invention, while using the term "first generation coil" to refer to a generation coil with respect to which chopper control of periodically interrupting energizing current is performed to increase power that the generation coil supplies to loads (in the present embodiment, generation coil for driving constantly driven loads) and the term "second generation coil" to refer to another generation coil that is permitted to stop or limit power supply to corresponding loads while chopper control for increasing output of the first generation coil is being performed (in the present embodiment, generation coil for driving occasionally driven loads), supply to loads of a DC voltage boosted to a higher level than conventionally achieved can be achieved by magnetically-coupling tightly the first generation coil and the second generation coil, and performing chopper control of currents flowing through both the first generation coil and the second generation coil. Further, when performing chopper control of currents flowing through both the first generation coil and the second generation coil, the supply of power from the second generation coil to the second loads is stopped or limited in order to effectively use as great a proportion as possible of the energy released from the second generation coil when the current flowing through the second generation coil is interrupted for boosting the voltage induced in the first generation coil.

In the present embodiment, the first generation coil is provided with a greater number of turns than the second generation coil so that the output of load current from the first generation coil starts when the rotation speed of the internal combustion engine (the rotation speed of the generator rotor) increases to reach a first preset speed that is set to be lower than an idling rotation speed of the internal combustion engine, and the output of load current from the second generation coil starts when the rotation speed of the internal combustion engine increases to reach a second preset speed that is higher than the first preset speed.

Further, the term "third generation coil" is used to refer to a generation coil for driving control system loads, and this generation coil is provided with an even greater number of turns than the first generation coil in order to be able to start the supply of load current at a rotation speed even lower than the rotation speed at which the first generation coil starts the supply of load current.

Figure 1:
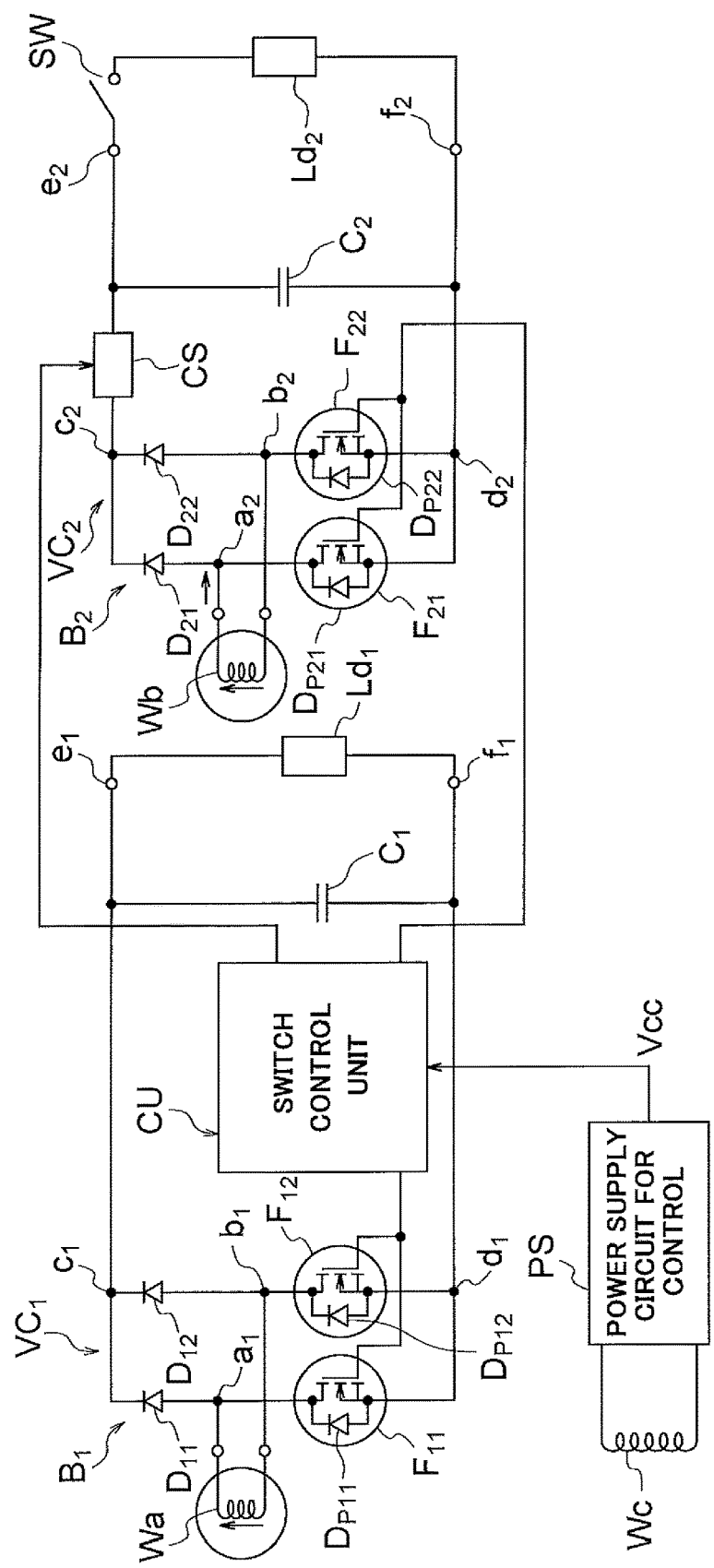
FIG. 1 is a circuit diagram showing a circuit configuration of one embodiment of a power supply device for an internal combustion engine of the present invention.

FIG. 1 shows an electrical configuration of a first embodiment of a power supply device for an internal combustion engine of the present invention. In FIG. 1, "Wa" and "Wb" respectively indicate a first generation coil and a second generation coil that are provided to an AC generator driven by an internal combustion engine, and "Ld1" and "Ld2" respectively indicate a first load receiving power supplied from the first generation coil and a second load receiving power supplied from the second generation coil. Further, "VC1" indicates a first voltage conversion circuit that converts an output voltage of the first generation coil Wa into a DC voltage to be supplied to the first load Ld1, "VC2" indicates a second voltage conversion circuit that converts an output voltage of the second generation coil Wb into a DC voltage to be supplied to the second load Ld2, and "CS" indicates a energization-controlling switch inserted between the second voltage conversion circuit VC2 and the second load Ld2. The first voltage conversion circuit VC1, the second voltage conversion circuit VC2, and the energization-controlling switch CS constitute an AC/DC conversion circuit for converting AC output voltage from the generator into DC voltages to be applied to the first load Ld1 and the second load Ld2.

The first voltage conversion circuit VC1 comprises a first bridge circuit B1 in which upper arms of the two legs of the bridge are configured by using a diode D11 and a diode D12, and lower arms of the two legs are configured by using a MOSFET F11 and a MOSFET F12.

In the present embodiment, the MOSFETs F11 and F12 configuring the lower arms of the first bridge circuit B1 constitute first switching means. Further, the diodes D11 and D12 configuring the upper arms of the first bridge circuit B1, and parasitic diodes Dp11 and Dp12, each formed between a drain and a source of a corresponding one of the MOSFETs F11 and F12, constitute a full-bridge first rectification circuit.

A connection point a1 of an anode of the diode D11 and the drain of the MOSFET F11 and a connection point b1 of an anode of the diode D12 and the drain of the MOSFET F12 serve as input terminals of the first rectification circuit, and a voltage induced in the first generation coil Wa is input between these input terminals. Further, a common connection point of cathodes of the diodes D11 and D12 and a common connection point of the sources of the MOSFETs F11 and F12 serve as a positive output terminal c1 and a negative output terminal d1 of the first rectification circuit, respectively, and a smoothing capacitor C1 is connected between these terminals. Load connection terminals e1 and f1 are respectively drawn out from the output terminals c1 and d1 of the first rectification circuit, and the first load Ld1 is connected between these two load connection terminals e1 and f1.

The second voltage conversion circuit VC2 comprises a second bridge circuit B2 in which upper arms of the two legs of the bridge are configured by using a diode D21 and a diode D22, and lower arms of the two legs are configured by using a MOSFET F21 and a MOSFET F22.

In the present embodiment, the MOSFETs F21 and F22 configuring the lower arms of the second bridge circuit B2 constitute second switching means. Further, the diodes D21 and D22 configuring the upper arms of the second bridge circuit B2, and parasitic diodes Dp21 and Dp22, are each formed between a drain and a source of a corresponding one of the MOSFETs F21 and F22, constitute a full-bridge second rectification circuit. A connection point a2 of an anode of the diode D21 and the drain of the MOSFET F21 and a connection point b2 of an anode of the diode D22 and the drain of the MOSFET F22 serve as input terminals of the second rectification circuit, and a voltage induced in the second generation coil Wb is input between these input terminals.

Further, a common connection point of cathodes of the diodes D21 and D22 and a common connection point of the sources of the MOSFETs F21 and F22 serve as a positive output terminal c2 and a negative output terminal d2 of the second rectification circuit, respectively. A positive load connection terminal e2 is drawn out from the positive output terminal c2, through the energization-controlling switch CS. Further, a negative load connection terminal f2 is drawn out from the negative output terminal d2 of the second rectification circuit, and the second load Ld2 is connected between the load connection terminals e2 and f2 via a switch SW. Further, a smoothing capacitor C2 is connected between the output terminals c2 and d2 of the second rectification circuit via the energization-controlling switch CS, which controls energization to the second load. The energization-controlling switch CS is configured by using a switching element capable of being controlled on and off, such as a MOSFET, and is controlled by a later-described switch control unit. Further, the switch SW is a switch that is put in closed state when causing the second load Ld2 to operate after startup of the internal combustion engine, and comprises a switch element capable of being controlled on and off.

In FIG. 1, "CU" indicates a switch control unit that controls the first switch means, which is configured by using the MOSFETs F11 and F12, the second switch means, which is configured by using the MOSFETs F21 and F22, and the energization-controlling switch CS. The switch control unit CU operates by being supplied with a power source voltage from a power supply circuit PS for control. The power supply circuit PS for control outputs a constant DC voltage Vcc, using as a power source a third generation coil Wc of the generator that has a sufficiently great number of turns and that outputs a voltage from an extremely low speed of the engine.

The switch control unit CU shown in FIG. 1 is configured to perform on-off control of both the first switch means (MOSFETs F11 and F12) and the second switch means (MOSFETs F21 and F22) and thereby concurrently perform chopper control of both the current flowing through the first generation coil Wa and the current flowing through the second generation coil Wb in order to boost the voltage supplied to the first load LD1, while putting the energization-controlling switch CS in off state and maintaining a state where energization from the second voltage conversion circuit to the second load is prevented, or while putting the energization-controlling switch CS in a state of switching on and off (state of receiving PWM control) so that current flowing from the second generation coil Wb to the second load Ld2 is limited. The switch control unit CU performs such control when it is necessary to boost the induction voltage of the first generation coil Wa and thereby increase the DC voltage supplied to the first load Ld1 to be higher than a voltage yielded by directly rectifying the induction voltage of the first generation coil Wa in order to cause the first load (in the present embodiment, constantly driven load) Ld1 to operate in a low rotation speed range of the engine; for example, upon startup of the internal combustion engine.

The first and second generation coils Wa and Wb are provided inside an AC generator that is driven by an internal combustion engine. The AC generator driven by the internal combustion engine is configured to include: an armature core having n (n being an integer no smaller than two) radially-arranged tooth portions; a stator having m (m being an integer no smaller than two and no greater than n) unit coils respectively wound around m tooth portions provided to the armature core; and a rotor driven to rotate by the internal combustion engine and including a field system having a plurality of magnetic poles opposing magnetic pole portions formed on tips of the respective tooth portions of the armature core. Note that variables m and n satisfy m<n in a case in which, for some reason, a part of the n tooth portions provided to the armature core do not have unit coils wound therearound and are left idle, but are assumed to normally satisfy m=n.

Figure 6:
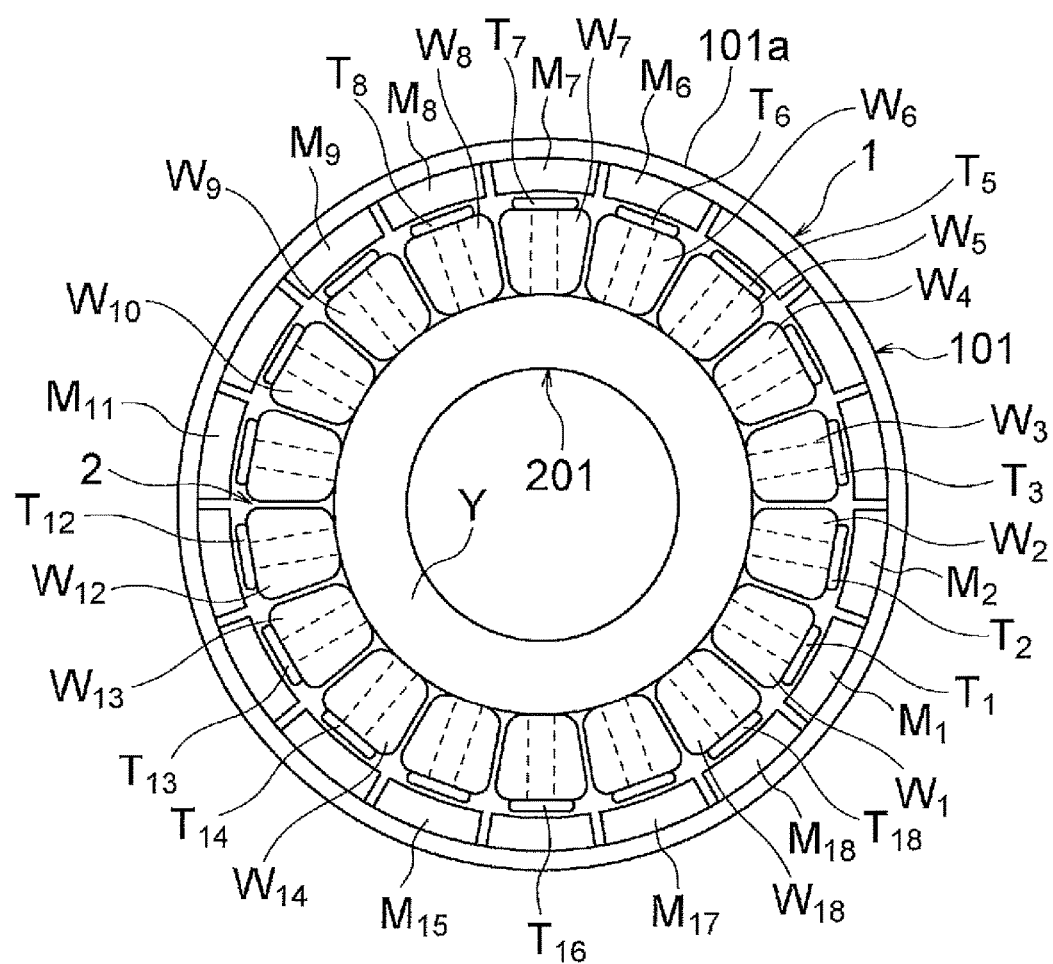
FIG. 6 is a front view schematically showing one example configuration of a generator used in an embodiment of the present invention.

In the present embodiment, a magnet generator whose rotor field system is configured by using a permanent magnet is used as the AC generator driven by an internal combustion engine. The magnet generator used in the present embodiment has the configuration shown in FIG. 6. In FIG. 6, "1" indicates an 18-pole magnet rotor, and "2" indicates an 18-pole stator. The magnet rotor 1 is composed of a rotor yoke (flywheel) 101 having a cup-shape, and 18 permanent magnets M1 through M18 fixed at equal angular intervals to an inner circumference of a circumferential wall portion 101a of the rotor yoke 101. An 18-pole magnetic field system is formed at an inner side of the circumferential wall portion of the rotor yoke 101 by the series of permanent magnets M1 through M18 being magnetized in the radial direction of the rotor yoke 101 while varying their orientations in alternating state.

The stator 2 comprises an armature core 201 having a structure where 18 tooth portions T1 through T18 project radially at equal angular distance from an outer circumferential portion of an annular yoke Y, and unit coils W1 through W18 wound around respective ones of a series of tooth portions T1 through T18 of the armature core 201. The stator 2 is fixed to a case, a cover, or the like of an internal combustion engine while being concentrically arranged inside the magnet rotor 1. Further, magnetic pole portions formed at tips of the respective tooth portions T1 through T18 of the armature core are caused to oppose the magnetic poles M1 through M18 of the magnet rotor 1 across a gap.

In the present embodiment, the unit coils W1 through W18 of the stator 2 are wired to form the first generation coil Wa, the second generation coil Wb, and the third generation coil Wc. The first generation coil Wa is formed by wiring a plurality of unit coils wound around alternately-arranged tooth portions among the tooth portions provided to the armature core, and the second generation coil Wb is formed by wiring a plurality of unit coils wound around alternately-arranged tooth portions that have a positional relationship of each being adjacent to one of the tooth portions around which the plurality of unit coils forming the first generation coil are wound, among the tooth portions provided to the armature core. Further, the third generation coil Wc is formed by wiring the rest of the unit coils.

That is, the first generation coil and the second generation coil are magnetically-coupled tightly by arranging tooth portions around which unit coils forming the first generation coil are wound each to be adjacent to one of the tooth portions around which unit coils forming the second generation coil.

In the example shown in FIG. 6, the first generation coil Wa is formed by connecting in series the six alternately-arranged unit coils W2, W4, W6, W8, W10, and W12, among the unit coils W1 through W18 wound around the respective tooth portions T1 through T18 of the armature core. Further, the second generation coil Wb is formed by connecting in series the seven unit coils W1, W3, W5, W7, W9, W11, and W13, which are respectively wound around alternately-arranged tooth portions T1, T3, T5, T7, T9, T11, and T13, which are adjacent to the tooth portions T2, T4, T6, T8, T10, and T12, around which the unit coils W2, W4, W6, W8, W10, and W12 are respectively wound. Further, the third generation coil Wc is formed by connecting in series the five remaining unit coils W14 through W18.

Figure 2:
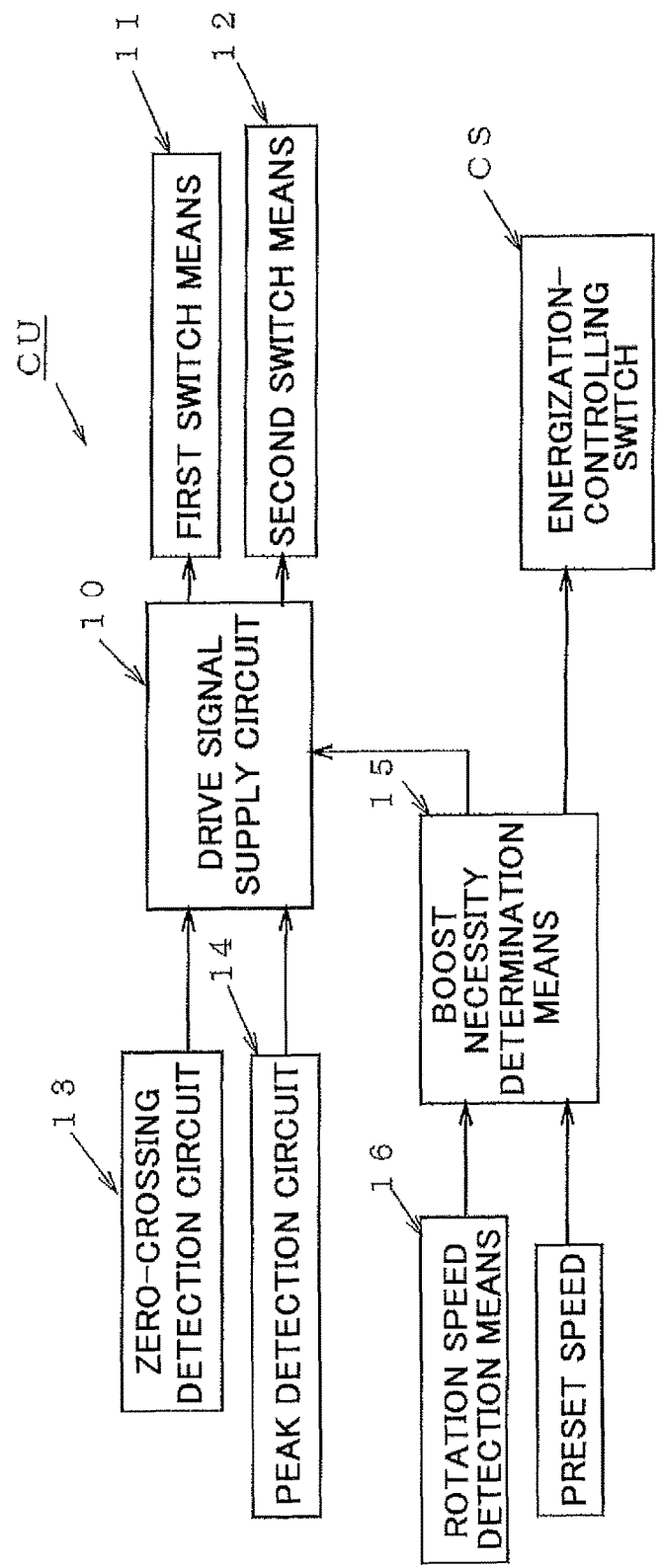
FIG. 2 is a block diagram showing one example configuration of a control unit used in the embodiment shown in FIG. 1.

For example, the switch control unit CU is configured as shown in FIG. 2. In FIG. 2, "10" indicates a drive signal supply circuit for supplying drive signals to the MOSFETs F11 and F12 forming the first switch means 11, and the MOSFETs F21 and F22 forming the second switch means 12. Output of a zero-crossing detection circuit 13, output of a peak detection circuit 14, and output of voltage boost necessity determination means 15 are inputted to the drive signal supply circuit 10. The zero-crossing detection circuit 13 detects zero-crossing points of the output voltage of the first generation coil Wa (i.e., a zero-crossing point when the output voltage transitions from a negative half-wave to a positive half-wave, and a zero-crossing point when the output voltage transitions from a positive half-wave to a negative half-wave). The peak detection circuit 14 detects peak points of the output voltage of the first generation coil Wa.

The drive signal supply circuit 10, when it is necessary to perform an operation of boosting the voltage induced in the first generation coil Wa, concurrently supplies drive signals having pulse waveforms to the gates of the MOSFETs F11 and F12 and the gates of the MOSFETs F21 and F22 and causes the MOSFETs F11 and F12 and the MOSFETs F21 and F22 to switch on and off so that currents with periodically-interrupted flow through the first generation coil Wa and the second generation coil Wb, and thereby concurrently performs chopper control of the current flowing through the first generation coil Wa and chopper control of the current flowing through the second generation coil Wb.

When it is necessary to perform the boosting operation, the drive signal supply circuit 10 used in the present embodiment is configured to: concurrently supply the gates of the MOSFETs F11 and F12 forming the first switch means and the gates of the MOSFETs F21 and F22 forming the second switch means with high level drive signals to put the first and second switch means concurrently in on state from when the zero-crossing detection circuit 13 detects a zero-crossing point of each of the output voltages of the generation coils Wa and Wb (*3) until when the peak detection circuit 14 detects a peak point; and changing the drive signals supplied to the MOSFETs forming the first and second switch means to zero-level drive signals to put the first and second switch means concurrently in off state from when the peak detection circuit 14 detects a peak point until when the zero-crossing detection circuit 13 detects a zero-crossing point.

The voltage boost necessity determination means 15 is a means for determining whether there is a necessity of boosting the induction voltage of the first generation coil Wa. The voltage boost necessity determination means 15 shown in FIG. 2 compares a rotation speed detected by rotation speed detection means 16 for detecting the rotation speed of the internal combustion engine with a preset speed (startup completion speed) that is set to a speed suitable for determining that the startup of the internal combustion engine has been completed. When the rotation speed of the internal combustion engine is lower than the preset speed (i.e., when the startup of the engine has not yet been completed), the voltage boost necessity determination means 15 determines that it is necessary to boost the output voltage of the first generation coil Wa, and supplies the energization-controlling switch CS with an off instruction to put the switch CS in off state, in addition to supplying the drive signal supply circuit 10 with a drive signal output instruction. When the engine rotation speed is higher than or equal to the preset speed (i.e., when the startup of the engine has been completed), the voltage boost necessity determination means 15 determines that it is no longer necessary to boost voltage, and supplies the energization-controlling switch CS with an on instruction to put the switch CS in on state, in addition to supplying the drive signal supply circuit 10 with a drive signal stop instruction.

The rotation speed detection means 16 may detect engine rotation speed according to any method. For example, the rotation speed detection means 16 may be configured to detect engine rotation speed based on the amount of time from when the zero-crossing detection circuit 13 detects a zero-crossing point until when the zero-crossing detection circuit 13 detects a subsequent zero-crossing point. Alternatively, when a signal generator for generating a pulse signal each time the internal combustion engine rotates by a certain rotation angle is provided, the rotation speed detection means 16 may be configured to detect engine rotation speed according to the interval at which the signal generator generates pulses.

FIG. 8 shows an example of voltage and current waveforms indicating the operation of the power supply device of the present embodiment. (A) of FIG. 8 shows a waveform of AC voltages induced in the first generation coil Wa and the second generation coil Wb when the crankshaft of the engine rotates. (B) of FIG. 8 shows drive signals V11, V12, V21, and V22 that the drive signal supply circuit 10 respectively supplies to the MOSFETs F11, F12, F21, and F22. (C) of FIG. 8 shows waveforms of a DC voltage output from the first generation coil Wa via the voltage conversion circuit Vc1, and (D) of FIG. 8 shows waveforms of a DC voltage output from the first generation coil Wa via the voltage conversion circuit Vc1. Further, (E) of FIG. 8 shows a change in DC power output from the first generation coil Wa via the voltage conversion circuit Vc1.

The drive signal supply circuit 10 concurrently supplies the gates of the MOSFETs F11 and F12 with drive signals V11 and V12 having rectangular waveforms, respectively. The drive signals V11 and V12 maintain a high level from when the zero-crossing detection circuit 13 detects each zero-crossing point of the induction voltage of the first generation coil Wa until when the peak detection circuit 14 detects a peak point, and maintain zero-level from when the peak detection circuit 14 detects a peak point of the induction voltage of the first generation coil Wa until when the zero-crossing detection circuit 13 detects a zero-crossing point.

Further, the drive signal supply circuit 10 concurrently supplies the gates of the MOSFETs F21 and F22 with drive signals V21 and V22 having rectangular waveforms, respectively. The drive signals V21 and V22 maintain a high level from when the zero-crossing detection circuit 13 detects each zero-crossing point of the induction voltage of the second generation coil Wb until when the peak detection circuit 14 detects a peak point of the second generation coil Wb, and maintain zero-level from when the peak detection circuit 14 detects a peak point of the induction voltage of the second generation coil Wb until when the zero-crossing detection circuit 13 detects a zero-crossing point.

When drive signals are supplied concurrently to the MOSFETs F11 and F12 (i.e., to the first switch means) at each zero-crossing point of the induction voltage of the first generation coil Wa, the generation coil Wa is short-circuited due to both MOSFETs switching to on state concurrently, and a short-circuit current flows through the generation coil Wa. This short-circuit current increases as the induction voltage of the generation coil Wa rises. When the induction voltage of the generation coil Wa reaches a peak and the drive signals V11 and V12 become zero, the MOSFETs F11 and F12 switch to off state concurrently, resulting in the short-circuit current having been flowing until then being interrupted. Due to this interruption of current, a boosted voltage in a direction for maintaining the current having been flowing until then is induced in the generation coil Wa. In the present embodiment, the current having been flowing in the generation coil Wa is interrupted when the induction voltage of the generation coil Wa reaches its peak, whereby a high voltage can be induced in the generation coil Wa.

Further, when drive signals are supplied concurrently to the MOSFETs F21 and F22 (i.e., to the second switch means) at each zero-crossing point of the induction voltage of the second generation coil Wb, the generation coil Wb is short-circuited due to both MOSFETs switching to on state concurrently, and a short-circuit current flows through the generation coil Wb. When the induction voltage of the generation coil Wb reaches a peak and the drive signals V21 and V22 become zero, the MOSFETs F21 and F22 switch to off state concurrently, resulting in the short-circuit current having been flowing until then being interrupted. Due to this interruption of current, a boosted voltage is induced in the generation coil Wb.

In the power supply device of the present invention, due to the supply of power from the second generation coil Wb to the second load Ld2 being stopped in addition to the first generation coil Wa and the second generation coil Wb being magnetically-coupled tightly, most of the energy $(L \cdot i^2)/2$ released from the second generation coil Wb when current having been flowing therethrough is interrupted is transferred to the first generation coil and thus can be superimposed on the energy released from the first generation coil when the current flowing through the first generation coil is interrupted. Due to this, the voltage induced in the first generation coil Wa can be raised above the voltage induced when interrupting only the current having been flowing through the first generation coil Wa.

The current, voltage, and power supplied from the first voltage conversion circuit VC1 to the first load Ld1 when performing chopper control of only the current flowing through the first generation coil Wa are as indicated by curve a in (C), curve a in (D), and curve a in (E) of FIG. 8, respectively. Meanwhile, the current, voltage, and power supplied from the first voltage conversion circuit VC1 to the first load Ld1 when concurrently performing chopper control of both the current flowing through the first generation coil Wa and the current flowing through the second generation coil Wb are as indicated by curve b in (C), curve b in (D), and curve b in (E) of FIG. 8, respectively.

In such a manner, according to the power supply device of the present embodiment, it is possible to increase the voltage induced in the first generation coil to be higher than the voltage induced when interrupting only the current having been flowing through the first generation coil. Due to this, when applying the power supply device of the present embodiment to a battery-less machine driven by an internal combustion engine, it is possible to improve the startability of the engine by causing the output voltage of the first generation coil to start rising upon startup of the engine from a rotation speed lower than conventionally achieved and thereby driving constantly driven loads such as a fuel pump from when rotation is being performed at extremely low speed.

Note that the AC voltages induced in the first generation coil Wa and the second generation coil Wb are not precisely in the same phase. However, due to the phase difference between these voltages being very small, this phase difference does not impede the boosting operation.

With regards to chopper control performed with the expectation of yielding output from the first generation coil with the first generation coil and the second generation coil being magnetically-coupled tightly, the inventor of the present invention conducted an experiment where the following three types of control were performed in order to confirm the effect of the chopper control.

Figure 9:
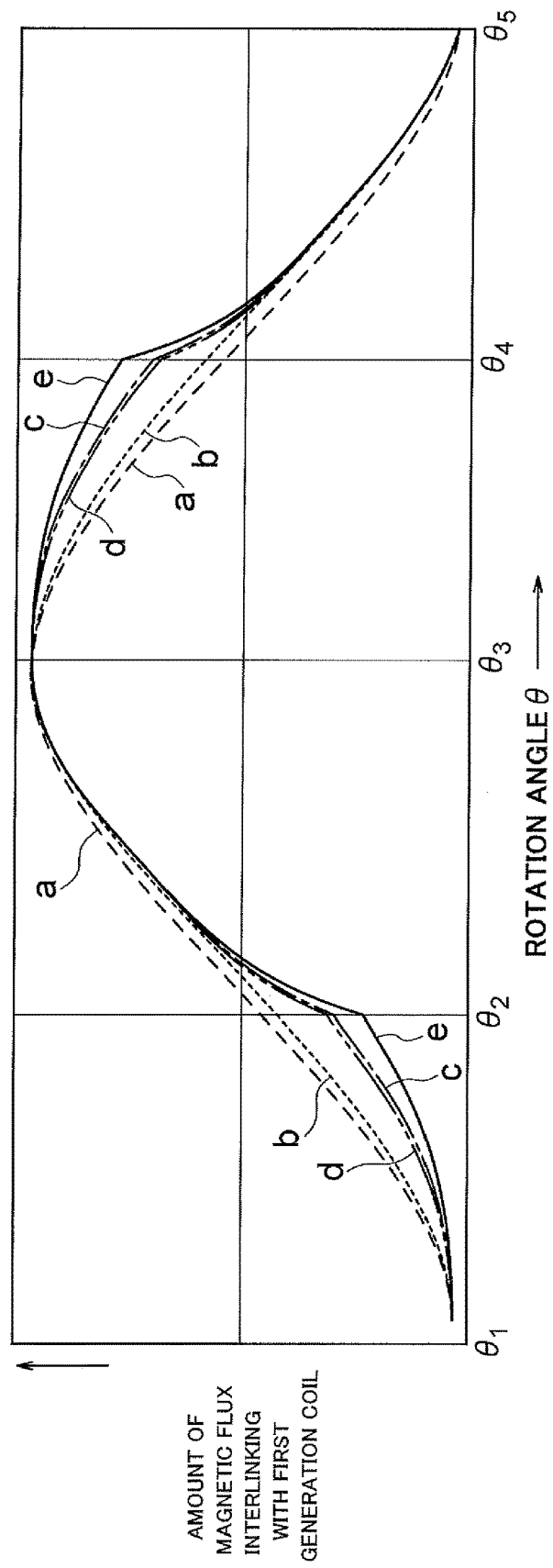
FIG. 9 is a waveform diagram schematically showing waveforms indicating a change in an amount of magnetic flux interlinking a first generation coil relative to rotation angle, in the power supply device of the present invention.

(i) Performing chopper control of both the first generation coil Wa and the second generation coil, which has a smaller number of turns than the first generation coil (ii) Performing chopper control of only the first generation coil Wa (iii) Performing chopper control of only the second generation coil Wb FIG. 9 schematically shows a change in an amount of magnetic flux interlinking with the first generation coil Wa, relative to a rotation angle θ of the rotor, when performing the above-described controls (i) through (iii). Curve a in FIG. 9 indicates a change in an amount of magnetic flux interlinking with the first generation coil accompanying rotation of the magnet rotor in no-load state, and curve b in FIG. 9 indicates a change in an amount of magnetic flux interlinking with the first generation coil when performing full-wave rectification of the output from the first generation coil Wa without performing chopper control. Further, curve c in FIG. 9 indicates a change in an amount of magnetic flux interlinking with the first generation coil when performing chopper control of only the current flowing through the first generation coil with the second generation coil Wb in no-load state, and curve d in FIG. 9 indicates a change in an amount of magnetic flux interlinking with the first generation coil when performing chopper control of only the current flowing through the second generation coil Wb with the first generation coil in no-load state. Further, curve (e) in FIG. 9 indicates a change in an amount of magnetic flux interlinking with the first generation coil Wa when performing chopper control of both the current flowing through the first generation coil Wa and the current flowing through the second generation coil Wb.

Note that in the example shown in FIG. 9, in each of; the case in which chopper control is performed only of the current flowing through the first generation coil Wa; the case in which chopper control is performed only of the current flowing through the second generation coil Wb; and the case in which chopper control is performed concurrently of both the current flowing through the first generation coil Wa and the current flowing through the second generation coil Wb, the positions of angles θ1, θ3, and θ5 on the horizontal axis are positions where the application of current to the generation coils is started, and the positions of angles θ2 and θ4 are positions where current having been flowing until then was interrupted.

When no load is connected to the first voltage conversion circuit VC1, which converts the output voltage of the first generation coil Wa into DC voltage, the amount of magnetic flux interlinking with the first generation coil Wa accompanying the rotation of the magnet rotor changes substantially sinusoidally, as shown by curve a of FIG. 9. Further, also when not performing chopper control with respect to either the first generation coil Wa or the second generation coil Wb, the amount of magnetic flux interlinking with the first generation coil Wa changes substantially sinusoidally accompanying the rotation of the rotor, as shown by curve b of FIG. 9.

Meanwhile, when performing chopper control of only the current flowing through the first generation coil Wa while maintaining the second generation coil Wb in no-load state (i.e., when periodically interrupting only the current flowing through the first generation coil), the magnetic flux generated from the first generation coil changes when the current having been flowing through the first generation coil Wa is interrupted at the positions of angles θ2 and θ4. Accordingly, as can be observed from curve c, the amount of magnetic flux interlinking with the first generation coil indicates a greater change than the sinusoidal change observed when chopper control is not performed at the positions of angles θ2 and θ4. This change in the amount of magnetic flux induces a boosted voltage in the first generation coil.

Further, when performing chopper control of only the current flowing through the second generation coil Wb while maintaining the first generation coil Wa in no-load state, the change in magnetic flux occurring when the current having been flowing through the second generation coil Wb is interrupted at the positions of angles θ2 and θ4 is superimposed onto the change in the amount of magnetic flux interlinking with the first generation coil, which is magnetically-coupled tightly, and a great change in the amount of magnetic flux interlinking with the first generation coil occurs. Accordingly, as can be observed from curve d, the amount of magnetic flux interlinking with the first generation coil at the positions of angles θ2 and θ4 indicates a greater change than the sinusoidal change observed when chopper control is not performed. This change in the amount of magnetic flux induces a boosted voltage in the first generation coil Wa.

Further, when performing chopper control of both the current flowing through the first generation coil Wa and the current flowing through the second generation coil Wb and both the current flowing through the first generation coil Wa and the current flowing through the second generation coil Wb are interrupted concurrently at the positions of angles θ2 and θ4, the change in the amount of magnetic flux occurring when the current having been flowing through the second generation coil is interrupted is superimposed on the change in the amount of magnetic flux interlinking with the first generation coil. Due to this, as can be observed from curve e in FIG. 9, the amount of magnetic flux interlinking with the first generation coil Wa exhibits an even greater change than when performing chopper control of only the current flowing through the first generation coil (i.e., the case corresponding to curve c). Accordingly, when performing chopper control of both the current flowing through the first generation coil Wa and the current flowing through the second generation coil Wb, the voltage induced in the first generation coil Wa when energizing current is interrupted at the positions of angles θ2 and θ4 indicates a voltage value even higher than the voltage value when performing chopper control of only the current flowing through the first generation coil Wa (i.e., the case corresponding to curve c).

Figure 10:
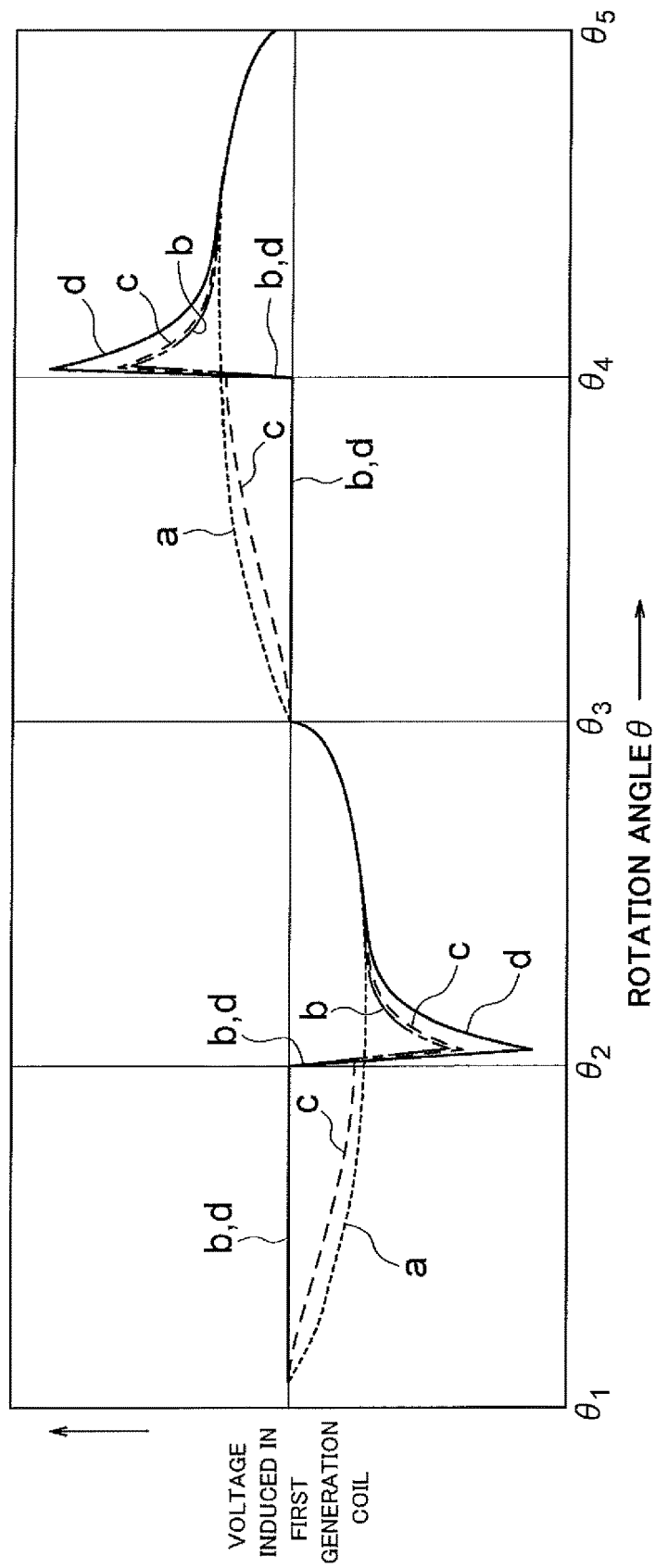
FIG. 10 is a waveform diagram schematically showing a waveform of a voltage induced in the first generation coil, for each of a case in which chopper control is performed of neither current flowing through the first generation coil nor current flowing through a second generation coil, a case in which chopper control is performed only of the current flowing through the first generation coil, a case in which chopper control is performed only of the current flowing through the second generation coil, and a case in which chopper control is performed of both the current flowing through the first generation coil and the current flowing through the second generation coil, in the power supply device of the present invention.

FIG. 10 shows waveform a being a waveform of a voltage induced in the first generation coil when not performing chopper control of either the current flowing through the first generation coil or the current flowing through the second generation coil, waveform b being a waveform of a voltage induced in the first generation coil when performing chopper control of only the current flowing through the first generation coil, waveform c being a waveform of a voltage induced in the first generation coil when performing chopper control of only the current flowing through the second generation coil, and waveform d being a waveform of a voltage induced in the first generation coil when performing chopper control of both the current flowing through the first generation coil and the current flowing through the second generation coil. As can be clearly observed from the waveforms shown in FIG. 10, by concurrently performing chopper control of both the current flowing through the first generation coil and the current flowing through the second generation coil, the first generation coil can be caused to output a voltage even higher than the voltage output when performing chopper control of only the current flowing through the first generation coil.

Figure 11:
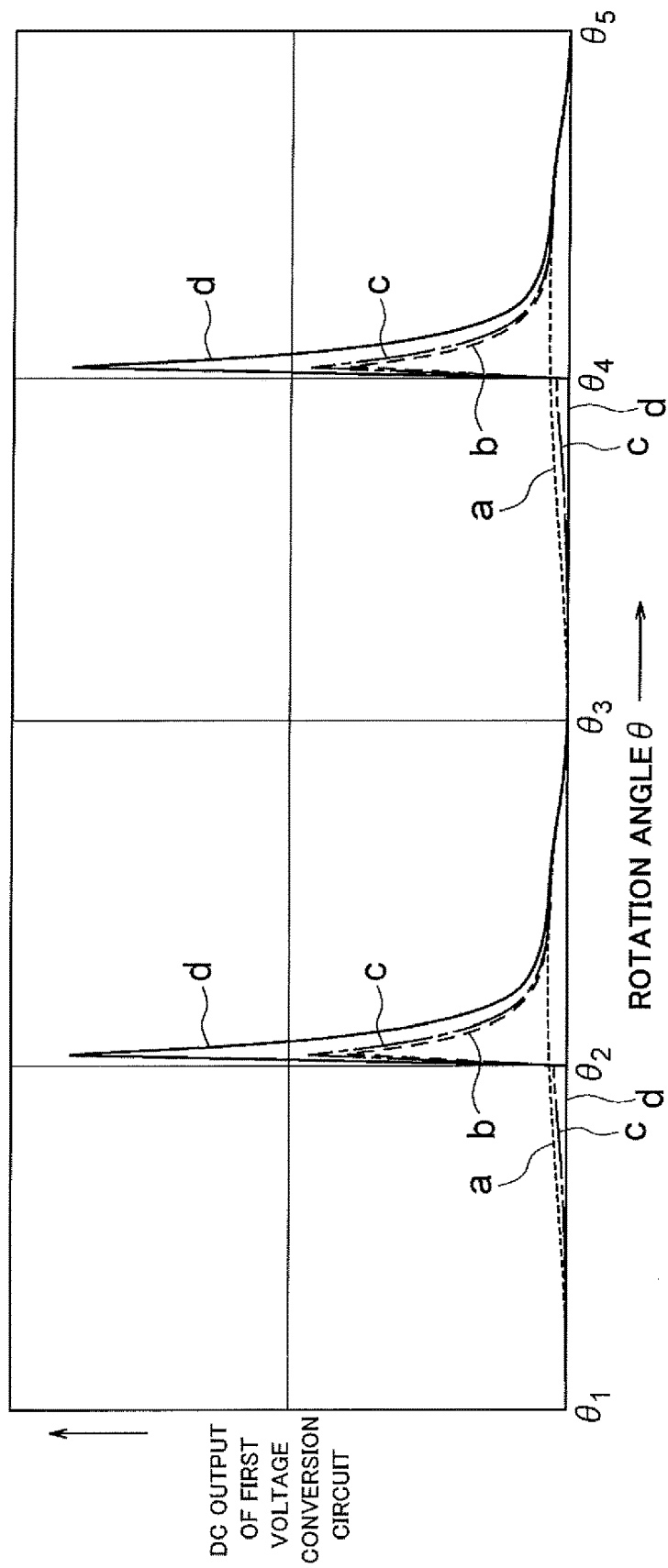
FIG. 11 is a waveform diagram schematically showing a change in DC power supplied from the first generation coil to a first load, for each of the case in which chopper control is performed of neither the current flowing through the first generation coil nor the current flowing through the second generation coil, the case in which chopper control is performed only of the current flowing through the first generation coil, the case in which chopper control is performed only of the current flowing through the second generation coil, and the case in which chopper control is performed of both the current flowing through the first generation coil and the current flowing through the second generation coil, in the power supply device of the present invention.

FIG. 11 shows changes in DC power supplied from the first generation coil Wa to the first load Ld1 through the voltage conversion circuit VC1 when the voltage output from the first generation coil exhibits the waveforms a, b, c, and d in FIG. 10. In FIG. 11, curve a indicates a change in DC power supplied from the first generation coil Wa to the load through the voltage conversion circuit VC1 when not performing chopper control of either the current flowing through the first generation coil Wa or the current flowing through the second generation coil Wb, and curve b indicates a change in DC power supplied from the first generation coil Wa to the load through the voltage conversion circuit VC1 when performing chopper control of only the current flowing through the first generation coil Wa. Further, curve c indicates a change in DC power supplied from the first generation coil Wa to the load through the voltage conversion circuit VC1 when performing chopper control of only the current flowing through the second generation coil Wb, and curve d indicates a change in DC power supplied from the first generation coil Wa to the load through the voltage conversion circuit VC1 when performing chopper control of both the current flowing through the first generation coil Wa and the current flowing through the second generation coil Wb.

From FIG. 11, it can be observed that by concurrently performing chopper control of both the current flowing through the first generation coil Wa and the current flowing through the second generation coil Wb, output even larger than the output from the first generation coil Wa supplied to a load when performing chopper control of only the current flowing through the first generation coil Wa (i.e., when applying conventional technology) can be yielded from the first generation coil.

In order to cause the operation of boosting the voltage induced in the first generation coil Wa to be performed efficiently by causing the MOSFETs F11, F12 and MOSFETs F21, F22 to switch on and off concurrently and performing chopper control of both the current flowing through the first generation coil Wa and the current flowing through the second generation coil Wb, it is preferable that the energy released from the second generation coil when the current having been flowing through the second generation coil Wb is interrupted be transferred to the first generation coil as much as possible by preventing the energy released from the second generation coil from being absorbed by the second load Ld2 to be lost. For this purpose, in the above-described embodiment, the energization-controlling switch CS is put in off state when performing chopper control of both the current flowing through the first generation coil and the current flowing through the second generation coil so that power from the second generation coil Wb is not supplied to the second load Ld2.

In the above, description is provided that the energization-controlling switch CS, which is provided between the second generation coil Wb and the load Ld2, is maintained in off state when performing chopper control of both the current flowing through the first generation coil and the current flowing through the second generation coil to increase the output of the first generation coil. However, instead of maintaining the energization-controlling switch CS in off state, the energization-controlling switch CS may be switched on and off at a predetermined duty ratio (i.e., PWM control may be performed of the power supplied from the second generation coil Wb to the second load Ld2 through the second voltage conversion circuit VC2), whereby chopper control of both the current flowing through the first generation coil and the current flowing through the second generation coil can be performed concurrently while limiting the power supplied from the second generation coil to the second load Ld2. When making such a configuration, the value of the voltage output from the first generation coil can be adjusted by controlling the on-duty ratio of the energization-controlling switch CS.

Figure 3:
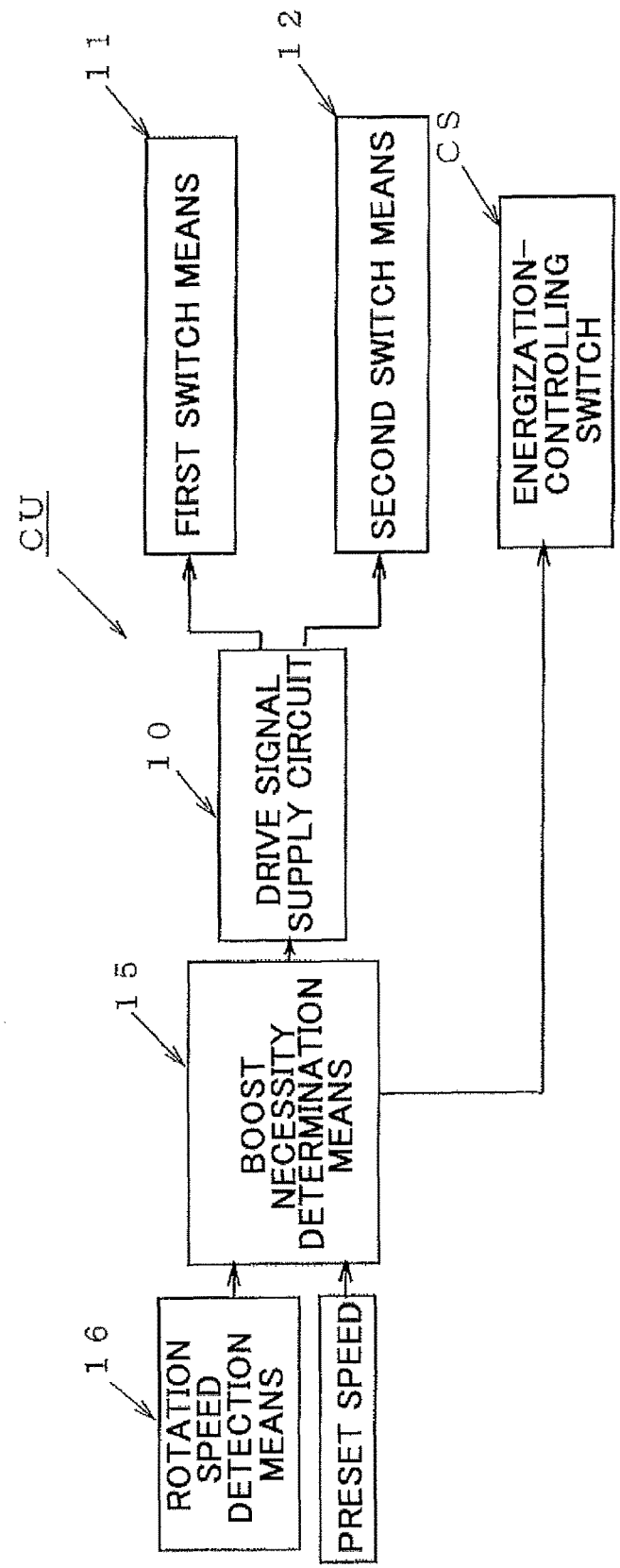
FIG. 3 is a block diagram showing another example configuration of the control unit used in the embodiment shown in FIG. 1.

In the above-described embodiment, zero-crossing points and peak points of induction voltages of generation coils are detected, and the first switch means and the second switch means are switched on and off so that current starts to flow through the generation coils at the zero-crossing points of the induction voltages and current is interrupted at the peak points. However, the first and second switch means need not be caused to switch on and off in the manner described in the above-described embodiment. For example, a pulse signal with higher frequency than the maximum values of output frequencies of the first generation coil and the second generation coils may be concurrently supplied to the gates of the MOSFETs constituting the first and second switch means, so that the currents flowing through the first generation coil and the second generation coils are periodically interrupted at a frequency sufficiently higher than the maximum frequencies of the output voltages of both generation coils. In this case, the zero-crossing detection circuit and the peak detection circuit can be omitted from the switch control unit CU as shown in FIG. 3.

It is preferable to configure the switch control unit CU to perform the on-off control of the first switch means and the on-off control of the second switch means synchronously as described in the above-described embodiment. However, the switch control unit CU may be configured to perform the on-off control of the first switch means and the on-off control of the second switch means asynchronously when the on-off control of the first switch means and the on-off control of the second switch means are to be performed at a frequency sufficiently higher than the maximum frequencies of the output voltages of the first and second generation coils.

In the above-described embodiment, the switch SW determining whether or not energizing current is applied to the occasionally driven load Ld2 is provided in addition to the energization-controlling switch CS, which is for cutting off the second generation coil and second load from one another when the operation of boosting the induction voltage of the first generation coil is performed. However, the switch SW may be omitted and the energization-controlling switch CS may be configured to also achieve the function of the switch SW.

In the above-described embodiment, the energization-controlling switch CS is inserted between the second voltage conversion circuit VC2 and the second load Ld2. However, the energization-controlling switch does not necessarily have to be a switch inserted between the second voltage conversion circuit VC2 and the second load Ld2, as long as the energization-controlling switch is a switch capable of controlling energization from the second voltage conversion circuit to the second load.

Figure 4:
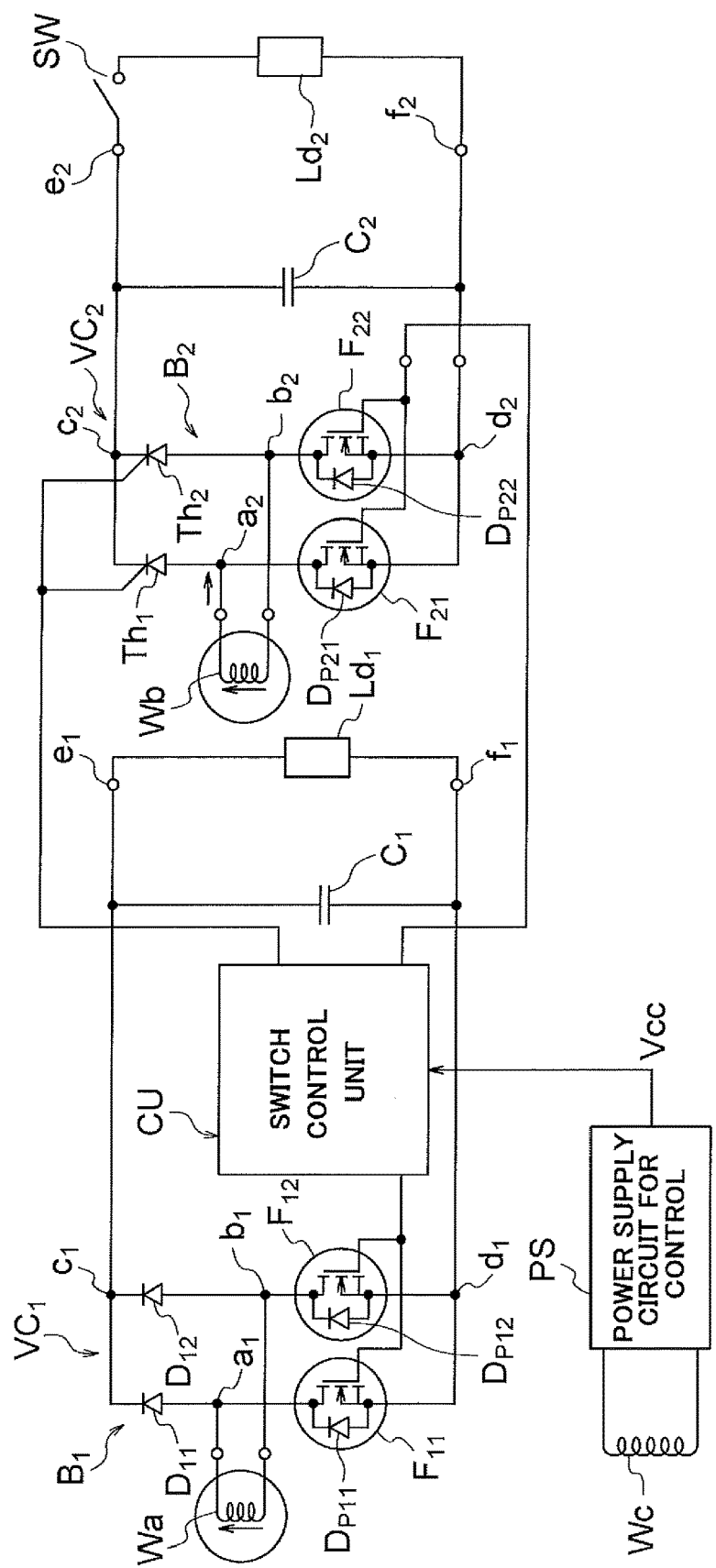
FIG. 4 is a circuit diagram showing another embodiment of the power supply device for an internal combustion engine of the present invention.

For example, as shown in FIG. 4, in addition to making a configuration such that upper arms of the two legs of the second bridge circuit B2 forming the second voltage conversion circuit VC2 are configured by using thyristors Th1 and Th2, the lower arms of the two legs are configured by using the MOSFETs F21 and F22, and the MOSFETs F21 and F22 constitute the second switching means, a configuration may be made of configuring the second rectification circuit with the thyristors configuring the upper arms of the second bridge circuit B2 and the parasitic diodes each formed between a drain and a source of a corresponding one of the MOSFETs F21 and F22 forming the lower arms of the second bridge circuit B2 to provide the thyristors Th1 and Th2 with the function as the energization-controlling switch. In this case, the switch control unit CU is configured to stop the supply of trigger signals to the thyristors Th1 and Th2 of the second voltage conversion circuit VC2 until the startup of the internal combustion engine is completed, and supply trigger signals to the thyristors Th1 and Th2 after the startup of the internal combustion engine is completed.

In order to boost the output voltage of the first generation coil Wa to a voltage higher than the output voltage yielded when performing chopper control of the current flowing through the first generation coil Wa itself, it is preferable to concurrently perform chopper control of both the current flowing through the first generation coil Wa and the current flowing through the second generation coil Wb, which is magnetically-coupled tightly to the first generation coil Wa, as described in the above-described embodiment. However, when it is possible to increase the inductance L of the second generation coil Wb to be greater than the inductance of the first generation coil Wa by providing the second generation coil Wb with a greater number of turns than the first generation coil Wa, the induction voltage of the first generation coil Wa can be boosted to a higher voltage than when performing chopper control of only the current flowing through the first generation coil Wa with energy released from the second generation coil Wb when the current flowing through the second generation coil Wb is interrupted. Accordingly, when it is necessary to increase the voltage output from the first generation coil to a voltage higher than when performing chopper control of only the current flowing through the first generation coil but it is not necessary to increase the voltage output from the first generation coil to a voltage as high as when performing chopper control of both the current flowing through the first generation coil and the current flowing through the second generation coil, the configuration may be made of boosting the voltage output from the first generation coil by providing the second generation coil Wb with a greater number of turns than the first generation coil Wa, and performing chopper control of only the current flowing through the second generation coil Wb.

Figure 5:
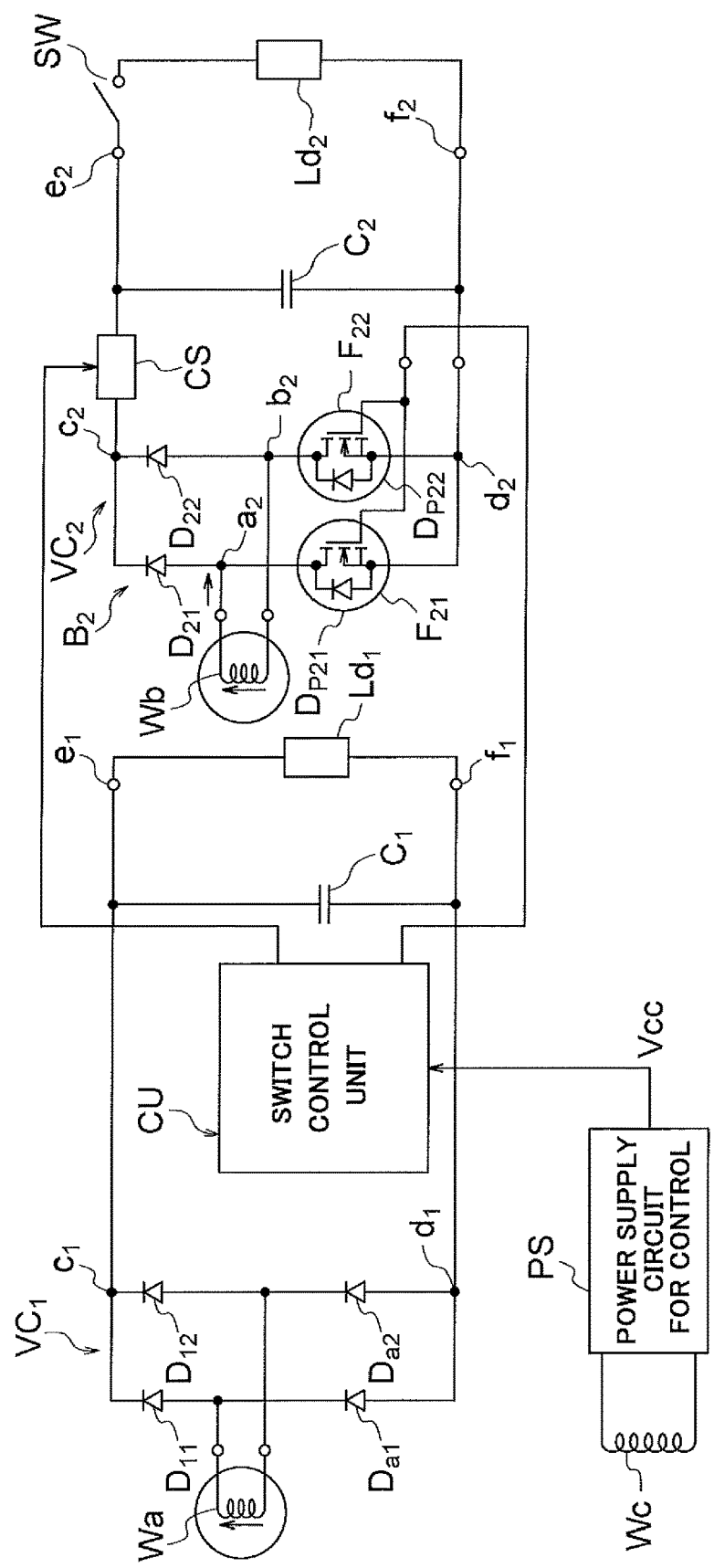
FIG. 5 is a circuit diagram showing yet another embodiment of the power supply device for an internal combustion engine of the present invention.

When making the above-described configuration, the first voltage conversion circuit VC1 is configured by using a full-bridge diode rectification circuit having diodes D11 and D12 constituting the upper arms of the bridge and diodes Da1 and Da2 constituting the lower arms of the bridge, and only the second voltage conversion circuit VC2 is configured as a hybrid bridge rectification circuit configured from the diodes D21 and D22 and the MOSFETs F21 and F22, as shown in FIG. 5. In such a case, the switch control circuit CU is configured to perform on-off control of the MOSFETs F21 and F22 (second switch means) in order to boost the voltage supplied to the first load Ld1 while putting the energization-controlling switch CS in off state to interrupt energization from the second voltage conversion circuit to the second load, or while switching the energization-controlling switch CS on and off to limit the current flowing from the second generation coil Wb to the second load Ld2.

In the above-described embodiment, the first generation coil and the second generation coil are magnetically-coupled tightly by winding the unit coils forming the first generation coil Wa and the unit coils forming the second generation coil Wb around adjacent tooth portions, as shown in FIG. 6. Alternatively, the first generation coil and the second generation coil may be magnetically-coupled tightly by providing each unit coil constituting part of the first generation coil Wa to form a pair with one of the unit coils forming the second generation coil Wb, and winding the unit coils of the first generation coil and the second generation coil forming a pair around the same tooth portion of the armature core, as shown in FIG. 7.

Figure 7:
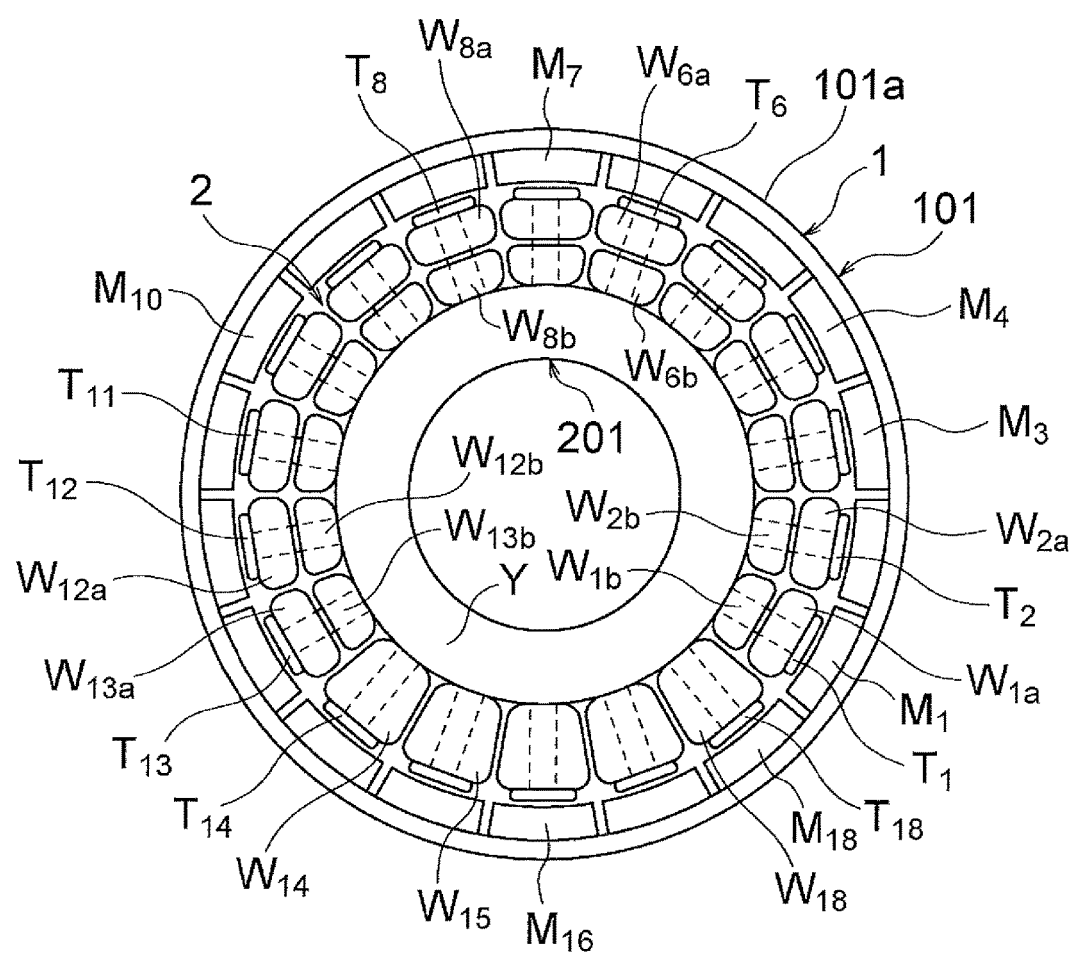
FIG. 7 is a front view schematically showing another example configuration of a generator used in an embodiment of the present invention.
Figure 8A:
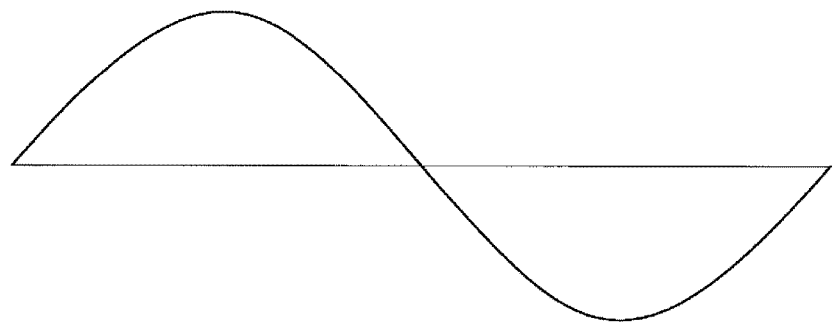
FIG. 8A through 8E include waveform diagrams for explaining operations of one embodiment of the power supply device of the present invention.
Figure 8B:
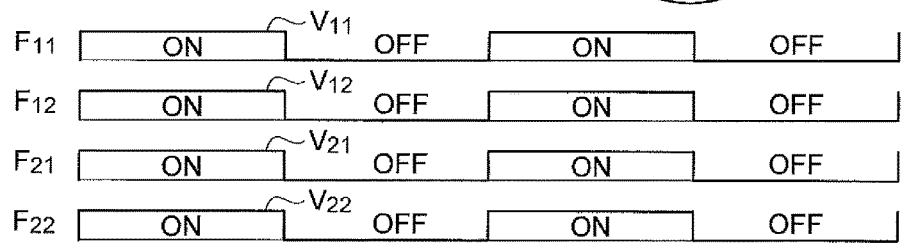
Figure 8C:
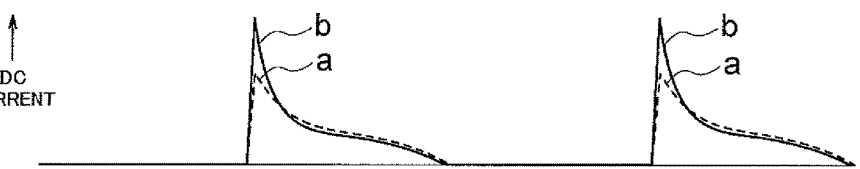
Figure 8D:
Figure 8E:
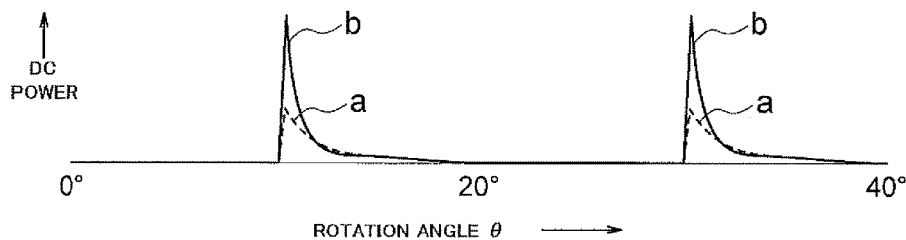

In the example shown in FIG. 7, the first generation coil Wa is configured by using unit coils W1a through W13a, and the second generation coil Wb is configured by using unit coils W1b through W13b. Further, the unit coils W1a through W13a respectively form pairs with the unit coil W1b through W13b, and the unit coils forming a pair, i.e., (W1a, W1b), (W2a, W2b), . . . , (W13a, W13b), are wound around one of the tooth portions T1 through T13.

In the example shown in FIG. 7, unit coils forming a pair are wound around the same tooth portion arranged side by side in the radial direction of the armature core. However, unit coils forming a pair may be wound around one over the other on the same tooth portion.

In the above-described embodiment, the first through third generation coils are provided in the generator. However, the generator may be further provided with one or more additional generation coils.

In the above-described embodiment, the first and second switch means provided to the voltage conversion circuits are configured by using MOSFETs. However, it suffices to configure the first switch means and the second switch means by using other semiconductor switch elements that can be controlled on and off, and the first switch means and the second switch means may be configured by using other switch elements such as IGBTs. When the switch elements used to configure the first and second switch means do not have parasitic diodes, diodes are connected in parallel with the switch elements used to configure the first switch means and the second switch means.

In the full-wave rectification circuits forming the first voltage conversion circuit VC1 and the second voltage conversion circuit VC2 in the above-described embodiment, diodes or thyristors are arranged in the upper arms of the bridge, and switch elements (MOSFETs in the above-described embodiment) used to configure the first switch means and the second switch means are arranged in the lower arms of the bridge. However, it suffices to provide the first switch means and the second switch means to short-circuit the first generation coil and the second generation coil when put in on state, and switch elements used to configure the first switch means and the second switch means may be arranged in the upper arms of the bridge circuit and diodes or thyristors may be arranged in the lower arms of the bridge.

In the above-described embodiment, the generator is configured to output a single-phase AC voltage. However, the present invention is applicable to a case in which the generator is configured to output a three-phase AC voltage.

1 Magnet rotor
101 Rotor yoke
M1-M18 Permanent magnets
2 Stator
201 Armature core
T1-T18 Tooth portions of armature core
W1-W18 Unit coils
W1a-W13a Unit coils
W1b-W13b Unit coils
Wa First generation coil
Wb Second generation coil
Wc Third generation coil
VC1 First voltage conversion circuit
VC2 Second voltage conversion circuit
B1 First bridge circuit
B2 Second bridge circuit
CS Energization-controlling switch
Ld1 First load
Ld2 Second load
CU Switch control unit
F11, F12, F21, F22 MOSFETs

The invention claimed is:

1. A power supply device for an internal combustion engine, comprising: an AC generator and an AC/DC conversion circuit for converting an output voltage of the AC generator into a DC voltage, the AC generator including a stator having an armature core that has n (n being an integer no smaller than two) radially-arranged tooth portions, and m (m being an integer no smaller than two and no greater than n) unit coils respectively wound around m tooth portions provided to the armature core, and a rotor driven to rotate by an internal combustion engine and including a field system having a plurality of magnetic poles opposing magnetic pole portions formed on tips of the respective tooth portions of the armature core, wherein the m unit coils are wired to form at least a first generation coil and a second generation coil;

the first generation coil is formed by wiring a plurality of unit coils wound around alternately-arranged tooth portions among the m tooth portions provided to the armature core;

the second generation coil is formed by wiring a plurality of unit coils wound around alternately-arranged tooth portions that have a positional relationship of each being adjacent to one of the m tooth portions around which the plurality of unit coils forming the first generation coil are wound;

the AC/DC conversion circuit includes: a first voltage conversion circuit having first switch means for periodically interrupting a current flowing through the first generation coil when on-off control has been performed and a first rectification circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load; and the power supply device for an internal combustion engine is provided with a switch control unit for performing on-off control of both the first switch means and the second switch means in order to boost the voltage supplied to the first load, while putting the energization-controlling switch in an off state to maintain a state where the energization from the second voltage conversion circuit to the second load is prevented, or while switching the energization-controlling switch on and off to limit a current flowing from the second generation coil to the second load.

2. A power supply device for an internal combustion engine, comprising: an AC generator and an AC/DC conversion circuit for converting an output voltage of the AC generator into a DC voltage, the AC generator including a stator having an armature core that has n (n being an integer no smaller than two) radially-arranged tooth portions, and m (m being an integer no smaller than two and no greater than n) unit coils respectively wound around m tooth portions provided to the armature core, and a rotor driven to rotate by an internal combustion engine and including a field system having a plurality of magnetic poles opposing magnetic pole portions formed on tips of the respective tooth portions of the armature core, wherein
the m unit coils are wired to form at least a first generation coil and a second generation coil;
each unit coil constituting part of the first generation coil is provided to form a pair with one unit coil constituting the second generation coil, and unit coils of the first generation coil and the second generation coil that form a pair are wound around a same tooth portion of the armature core;
the AC/DC conversion circuit includes: a first voltage conversion circuit having first switch means for periodically interrupting a current flowing through the first generation coil when on-off control has been performed and a first rectification circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load; and
the power supply device for an internal combustion engine is provided with a switch control unit for performing on-off control of both the first switch means and the second switch means in order to boost the voltage supplied to the first load, while putting the energization-controlling switch in an off state to maintain a state where the energization from the second voltage conversion circuit to the second load is prevented, or while switching the energization-controlling switch on and off to limit a current flowing from the second generation coil to the second load.

3. The power supply device for an internal combustion engine as set forth in claim 1, wherein
the first load is an electric component required to be driven for operation of the internal combustion engine;
the second load is a load permitted to stop driving during a process of starting up the internal combustion engine; and
a number of turns of the first generation coil and a number of turns of the second generation coil are set so that output of a load current from the first voltage conversion circuit starts when a rotation speed of the rotor increases to reach a first preset speed set to be lower than an idling rotation speed of the internal combustion engine, and output of a load current from the second voltage conversion circuit starts when the rotation speed of the rotor increases to reach a second preset speed higher than the first preset speed.

4. The power supply device for an internal combustion engine as set forth in claim 3, wherein
the switch control unit is configured to perform the on-off control of the first switch means and the on-off control of the second switch means concurrently until the startup of the internal combustion engine is completed.

5. The power supply device for an internal combustion engine as set forth in claim 4, wherein
the switch control unit is configured to perform the on-off control of the first switch means and the on-off control of the second switch means synchronously.

6. The power supply device for an internal combustion engine as set forth in claim 3, wherein
the first voltage conversion circuit comprises a first bridge circuit in which one of an upper arm and a lower arm of each leg is configured from a diode and the other one of the upper arm and the lower arm of each leg is configured from a MOSFET, the first switch means is configured from the MOSFET that constitutes part of the other one of the upper arm and the lower arm of the first bridge circuit, and the first rectification circuit is configured from the diode constituting part of the one of the upper and the lower arm of the first bridge circuit and a parasitic diode formed between a drain and a source of the MOSFET constituting part of the other one of the upper arm and the lower arm of the first bridge circuit; and
the second voltage conversion circuit comprises a second bridge circuit in which one of an upper arm and a lower arm of each leg is configured from a diode and the other one of the upper arm and the lower arm of each leg is configured from a MOSFET, the second switch means is configured from the MOSFET constituting part of the other one of the upper arm and the lower arm of the second bridge circuit, and the second rectification circuit is configured from the diode constituting part of the one of the upper and the lower arm of the second bridge circuit and a parasitic diode formed between a drain and a source of the MOSFET constituting part of the other one of the upper arm and the lower arm of the second bridge circuit.

7. The power supply device for an internal combustion engine as set forth in claim 3, wherein
the switch control unit controls the energization-controlling switch so as to maintain the energization-controlling switch in an off state until the startup of the internal combustion engine is completed, and to permit the energization-controlling switch to switch to the on state after the startup of the internal combustion engine is completed.

8. The power supply device for an internal combustion engine as set forth in claim 3, wherein
the first voltage conversion circuit comprises a first bridge circuit in which one of an upper arm and a lower arm of each leg is configured from a diode and the other one of the upper arm and the lower arm of each leg is configured from a MOSFET, and the first switch means is configured from the MOSFET constituting part of the other one of the upper arm and the lower arm of the first bridge circuit, and the first rectification circuit is configured from the diode constituting part of the one of the upper and the lower arm of the first bridge circuit and a parasitic diode formed between a drain and a source of the MOSFET constituting part of the other one of the upper arm and the lower arm of the first bridge circuit, the second voltage conversion circuit comprises a second bridge circuit in which one of an upper arm and a lower arm of each leg is configured from a thyristor and the other one of the upper arm and the lower arm of each leg is configured from a MOSFET, the second switch means is configured from the MOSFET constituting part of the other one of the upper arm and the lower arm of the second bridge circuit, and the second rectification circuit is configured from the thyristor constituting part of the one of the upper and the lower arm of the second bridge circuit and a parasitic diode formed between a drain and a source of the MOSFET constituting part of the other one of the upper arm and the lower arm of the bridge circuit; and the switch control unit is configured to stop supply of trigger signals to the thyristors of the second voltage conversion circuit until the startup of the internal combustion engine is completed, and supply trigger signals to the thyristors of the second voltage conversion circuit after the startup of the internal combustion engine is completed.

9. A power supply device for an internal combustion engine, comprising: an AC generator and an AC/DC conversion circuit for converting an output voltage of the AC generator into a DC voltage, the AC generator including a stator having an armature core that has n (n being an integer no smaller than two) radially-arranged tooth portions, and m (m being an integer no smaller than two and no greater than n) unit coils respectively wound around m tooth portions provided to the armature core, and a rotor driven to rotate by an internal combustion engine and including a field system having a plurality of magnetic poles opposing magnetic pole portions formed on tips of the respective tooth portions of the armature core, wherein the power supply device for an internal combustion engine is characterized in that:

the m unit coils are wired to form at least a first generation coil and a second generation coil having a greater number of turns than the first generation coil;

the first generation coil is formed by wiring a plurality of unit coils wound around alternately-arranged tooth portions among the m tooth portions provided to the armature core;

the second generation coil is formed by wiring a plurality of unit coils wound around alternately-arranged tooth portions that have a positional relationship of each being adjacent to one of the m tooth portions around which the plurality of unit coils forming the first generation coil are wound;

the AC/DC conversion circuit includes: a first voltage conversion circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load; and the power supply device for an internal combustion engine is provided with a switch control unit for performing on-off control of the second switch means in order to boost the voltage supplied to the first load, while putting the energization-controlling switch in an off state to prevent the energization from the second voltage conversion circuit to the second load, or while switching the energization-controlling switch on and off to limit a current flowing from the second generation coil to the second load.

10. A power supply device for an internal combustion engine, comprising: an AC generator and an AC/DC conversion circuit for converting an output voltage of the AC generator into a DC voltage, the AC generator including a stator having an armature core that has n (n being an integer no smaller than two) radially-arranged tooth portions, and m (m being an integer no smaller than two and no greater than n) unit coils respectively wound around m tooth portions provided to the armature core, and a rotor driven to rotate by an internal combustion engine and including a field system having a plurality of magnetic poles opposing magnetic pole portions formed on tips of the respective tooth portions of the armature core, wherein the m unit coils are wired to form at least a first generation coil and a second generation coil having a greater number of turns than the first generation coil;

each unit coil constituting part of the first generation coil is provided to form a pair with one unit coil constituting part of the second generation coil, and unit coils of the first generation coil and the second generation coil that form a pair are wound around a same tooth portion of the armature core;

the AC/DC conversion circuit includes: a first voltage conversion circuit for rectifying and converting a voltage induced in the first generation coil into a DC voltage to be supplied to a first load; a second voltage conversion circuit having second switch means for periodically interrupting a current flowing through the second generation coil when on-off control has been performed and a second rectification circuit for rectifying and converting a voltage induced in the second generation coil into a DC voltage to be supplied to a second load; and an energization-controlling switch for controlling energization from the second voltage conversion circuit to the second load; and the power supply device for an internal combustion engine is provided with a switch control unit for performing on-off control of the second switch means in order to boost the voltage supplied to the first load, while putting the energization-controlling switch in an off state to maintain a state where the energization from the second voltage conversion circuit to the second load is prevented, or while switching the energization-controlling switch on and off to limit a current flowing from the second generation coil to the second load.

11. The power supply device for an internal combustion engine as set forth in claim 1, wherein the m unit coils wound around the m tooth portions of the armature core of the AC generator further include a unit coil constituting part of another power generation coil.

12. The power supply device for an internal combustion engine as set forth in claim 1, wherein the m unit coils wound around the m tooth portions of the armature core of the AC generator further include a unit coil constituting part of a third generation coil having a greater number of turns than the first generation coil;

the power supply device for an internal combustion engine is provided with a power supply circuit for control converting an output of the third generation coil into a constant DC voltage; and the switch control unit is configured to operate by receiving power source voltage from the power supply circuit for control.

* * * * *